(12) United States Patent
Park et al.

(10) Patent No.: US 10,827,541 B2
(45) Date of Patent: Nov. 3, 2020

(54) METHOD AND APPARATUS FOR TRANSMITTING OR RECEIVING DATA AND CONTROL INFORMATION IN WIRELESS COMMUNICATION SYSTEM

(71) Applicant: Samsung Electronics Co., Ltd., Gyeonggi-do (KR)

(72) Inventors: Sungjin Park, Gyeonggi-do (KR); Jeongho Yeo, Gyeonggi-do (KR); Jinyoung Oh, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/274,880

(22) Filed: Feb. 13, 2019

(65) Prior Publication Data

US 2019/0254088 A1 Aug. 15, 2019

(30) Foreign Application Priority Data

Feb. 13, 2018 (KR) .................. 10-2018-0017446

(51) Int. Cl.
*H04W 76/11* (2018.01)
*H04W 72/04* (2009.01)
(Continued)

(52) U.S. Cl.
CPC .......... *H04W 76/11* (2018.02); *H04L 1/0061* (2013.01); *H04L 1/1819* (2013.01); *H04W 72/042* (2013.01); *H04W 72/0446* (2013.01)

(58) Field of Classification Search
CPC ..... H04W 76/10; H04W 76/11; H04W 72/04; H04W 72/0406; H04W 72/042;
(Continued)

(56) References Cited

U.S. PATENT DOCUMENTS

2010/0054203 A1 3/2010 Damnjanovic et al.
2011/0194538 A1 8/2011 Zheng et al.
(Continued)

FOREIGN PATENT DOCUMENTS

KR 10-2018-0122796 11/2018

OTHER PUBLICATIONS

NTT Docomo, Inc., "Offline Summary for AI 7.3.3.4 UL Data Transmission Procedure", R1-1721510, 3GPP TSG RAN WG1 Meeting #91, Nov. 27-Dec. 1, 2017, 41 pages.
(Continued)

*Primary Examiner* — Kevin D Mew
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of a terminal, a method of a base station, a terminal, and a base station in a wireless communication system are provided. The method of the terminal in the wireless communication system includes receiving configuration information for configuring periodic data resources for transmitting or receiving data; receiving an interruption indicator based on an interruption radio network temporary identifier (RNTI); identifying that a part of a resource among the periodic data resources and a resource indicated by the interruption indicator overlap each other; and when the part of the resource among the periodic data resources and the
(Continued)

resource indicated by the interruption indicator overlap each other, preventing performance of data transmission or data reception on the resource which includes the overlapped part.

20 Claims, 12 Drawing Sheets

(51) Int. Cl.
*H04L 1/00* (2006.01)
*H04L 1/18* (2006.01)

(58) Field of Classification Search
CPC ............ H04W 72/044; H04W 72/0446; H04L 1/0061; H04L 1/1819
See application file for complete search history.

(56) References Cited

U.S. PATENT DOCUMENTS

| | | | |
|---|---|---|---|
| 2012/0129540 A1 | 5/2012 | Hakola et al. | |
| 2012/0230238 A1 | 9/2012 | Dalsgaard et al. | |
| 2014/0328329 A1* | 11/2014 | Novlan | H04W 72/042 370/336 |
| 2015/0195854 A1* | 7/2015 | Zhu | H04W 74/08 370/329 |
| 2015/0257160 A1* | 9/2015 | Ishida | H04W 72/0486 455/452.1 |
| 2015/0327315 A1* | 11/2015 | Xue | H04L 5/0044 370/330 |
| 2016/0135239 A1* | 5/2016 | Khoryaev | H04W 76/14 370/329 |
| 2016/0249336 A1* | 8/2016 | Jung | H04W 36/0072 |
| 2016/0337839 A1* | 11/2016 | Chae | H04W 72/1242 |
| 2017/0027013 A1* | 1/2017 | Kim | H04W 72/04 |
| 2017/0290008 A1* | 10/2017 | Tooher | H04L 1/0007 |
| 2017/0331577 A1* | 11/2017 | Parkvall | H04L 5/1469 |
| 2018/0048421 A1* | 2/2018 | Yeo | H04L 1/0046 |
| 2018/0145818 A1* | 5/2018 | Choi | H04L 5/023 |
| 2018/0167919 A1* | 6/2018 | Kim | H04W 24/10 |
| 2018/0176903 A1* | 6/2018 | Lee | H04W 72/042 |
| 2018/0213379 A1* | 7/2018 | Xiong | H04W 40/22 |
| 2018/0295651 A1* | 10/2018 | Cao | H04W 74/0833 |
| 2018/0324788 A1 | 11/2018 | Choi et al. | |
| 2020/0259896 A1* | 8/2020 | Sachs | G06K 19/06028 |

OTHER PUBLICATIONS

International Search Report dated May 27, 2019 issued in counterpart application No. PCT/KR2019/001746, 3 pages.

* cited by examiner

METHOD AND APPARATUS FOR TRANSMITTING OR RECEIVING DATA AND CONTROL INFORMATION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0017446, filed on Feb. 13, 2018, in the Korean Intellectual Property Office, the disclosure of which is incorporated herein by reference in its entirety.

BACKGROUND

1) Field

The present disclosure relates generally to a wireless communication system, and more particularly, to a method and an apparatus for transmitting or receiving data information by a terminal in a communication system.

2) Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a beyond 4G network or a post long term evolution (LTE) system. The 5G communication system is considered to be implemented in higher frequency (millimeter wave (mmWave)) bands, e.g., 60 gigahertz (GHz) bands, so as to accomplish higher data rates. To decrease propagation loss of radio waves and increase transmission distance, beamforming, massive multiple-input multiple-output (MIMO), full dimensional MIMO (FD-MIMO), array antenna, analog beamforming, and large scale antenna techniques are being discussed in 5G communication systems. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as advanced coding modulation (ACM), and filter bank multi carrier (FBMC), non-orthogonal multiple access (NOMA), and sparse code multiple access (SCMA) as advanced access technologies have been developed.

The Internet, which is a human-centered connectivity network where humans generate and consume information, is now evolving to the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as sensing technology, wired/wireless communication and network infrastructure, service interface technology, and security technology have been demanded for IoT implementation, a sensor network, machine-to-machine (M2M) communication, machine-type communication (MTC), and so forth have recently been researched. Such an IoT environment may provide intelligent Internet technology services that create a new value to human life by collecting and analyzing data generated by connected things. The IoT may be applied to a variety of fields including smart homes, smart buildings, smart cities, smart cars or connected cars, smart grids, health care, smart appliances and advanced medical services through convergence and combination between existing information technology (IT) and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology is an example of convergence between 5G technology and IoT technology.

As described above, multiple services may be provided to a user in a communication system, and in order to provide multiple services to a user, there is a need for a method of providing the services during the same time period according to the characteristics of the services, and an apparatus for performing the same. Presently, various services provided by a 5G communication system are being studied, and one of the various services is a service satisfying low-latency requirements.

SUMMARY

An aspect of the present disclosure provides a method and an apparatus for simultaneously providing services of different types (or the same type).

Another aspect of the present disclosure provides a method for adaptively supporting demodulation and decoding operations of a terminal according to the reception and detection of information by the terminal through a downlink control channel, and an apparatus for performing time-difference-based adaptive decoding and demodulation operations related to multiple channel transmissions/receptions which are performed by a terminal in order to support a particular service.

In accordance with an aspect of the present disclosure, a method of a terminal in a wireless communication system is provided. The method includes receiving configuration information for configuring periodic data resources for transmitting or receiving data, receiving an interruption indicator based on an interruption radio network temporary identifier (RNTI), identifying that a part of a resource among the periodic data resources and a resource indicated by the interruption indicator overlap each other, and when the part of the resource among the periodic data resources and the resource indicated by the interruption indicator overlap each other, preventing performance of data transmission or data reception on the resource which includes the overlapped part.

In accordance with an aspect of the present disclosure, a method of a base station in a wireless communication system is provided. The method includes transmitting configuration information for configuring periodic data resources for transmitting or receiving data, transmitting an interruption indicator based on an RNTI, identifying that a part of a resource among the periodic data resources and a resource indicated by the interruption indicator overlap each other, and when the part of the resource among the periodic data resources and the resource indicated by the interruption indicator overlap each other, preventing performance of data transmission or data reception on the resource which includes the overlapped part.

In accordance with an aspect of the present disclosure, a terminal in a wireless communication system is provided. The terminal includes a transceiver and a controller coupled with the transceiver and configured to receive configuration information for configuring periodic data resources for transmitting or receiving data, receive an interruption indicator based on an RNTI, identify that a part of a resource among the periodic data resources and a resource indicated by the interruption indicator overlap each other, and when the part of the resource among the periodic data resources and the resource indicated by the interruption indicator overlap each other, preventing performance of data transmission or data reception on the resource which includes the overlapped part.

In accordance with an aspect of the present disclosure, a base station in a wireless communication system is provided. The base station includes a transceiver and a controller coupled with the transceiver and configured to transmit configuration information for configuring periodic data resources for transmitting or receiving data, transmit interruption indicator based on an RNTI, identify that a part of a resource among the periodic data resources and a resource indicated by the interruption indicator overlap each other, and when the part of the resource among the periodic data resources and the resource indicated by the interruption indicator overlap each other, preventing performance of data transmission or data reception on the resource which includes the overlapped part.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
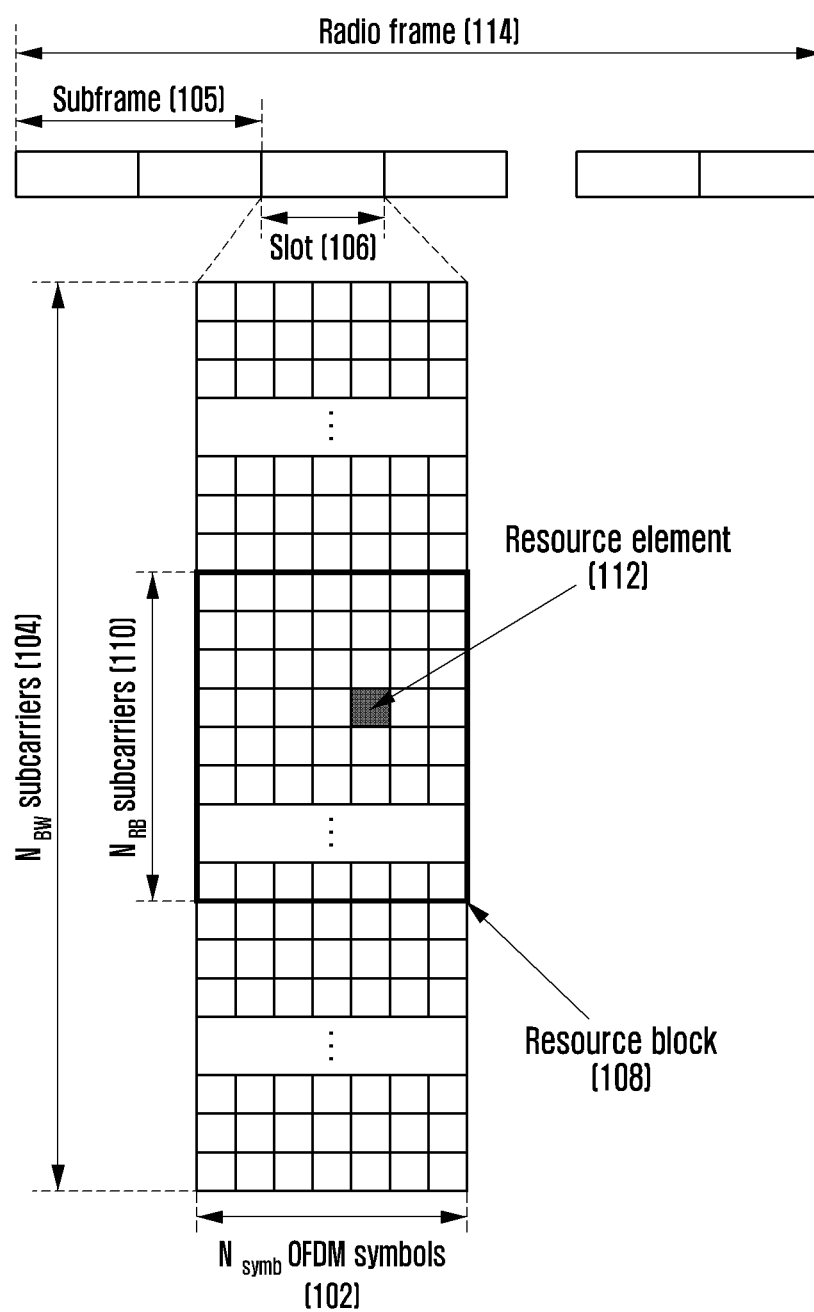
FIG. 1 is an illustration of a basic structure of a time-frequency domain, that is, a radio resource domain, in which data or control information is transmitted in a downlink of an LTE system and a system similar thereto.

Hereinafter, embodiments of the present disclosure are described in detail with reference to the accompanying drawings.

In describing the embodiments of the present disclosure, a description of technical contents which are well-known in the technical field to which the present disclosure pertains but are not directly associated with the present disclosure is omitted. Such an omission of unnecessary descriptions is intended to prevent obscuring the subject matter of the present disclosure and more clearly describe the subject matter thereof.

For the same reason, some elements are exaggerated, omitted, or schematically illustrated in the accompanying drawings. Further, the size of each element may not reflect each element's actual size. In each of the accompanying drawings, the same or corresponding elements are denoted by the same reference numerals.

The advantages and features of the present disclosure and methods of accomplishing the same will be apparent by making reference to the embodiments described below in detail with reference to the accompanying drawings. However, the present disclosure is not intended to be limited to the embodiments disclosed herein but may be implemented in various different forms. The following embodiments are provided only for completeness of the present disclosure and completely informing those skilled in the art of the scope of the present disclosure, but the scope of the present disclosure is defined only by the appended claims and their equivalents. Throughout the present disclosure, the same or like reference numerals designate the same or like elements.

Here, it may be understood that each block of processing flowcharts and combinations of the flowcharts may be performed by computer program instructions. Since these computer program instructions may be mounted in processors for a general computer, a special-purpose computer, or other programmable data-processing apparatuses, these instructions executed by the processors for the computer or the other programmable data-processing apparatuses create means performing functions described in block(s) of the flowcharts. Since these computer program instructions may also be stored in a computer-usable or non-transitory computer-readable memory of a computer or other programmable data-processing apparatuses in order to implement the functions in a certain scheme, the computer program instructions stored in the computer-usable or non-transitory computer-readable memory may also produce manufacturing articles including instruction means performing the functions described in block(s) of the flowcharts. Since the computer program instructions may also be loaded into a computer or other programmable data-processing apparatuses, the instructions may cause a series of operational steps to be performed on the computer or other programmable data-processing apparatuses so as to generate processes executable by the computer and enable an operation of the computer or other programmable data-processing apparatuses, and may also provide steps for implementing the functions described in the flowchart block(s).

In addition, each block may indicate some of modules, segments, or code including one or more executable instructions for executing a certain logical function(s). Further, it is to be noted that the functions mentioned in the blocks may occur out of order in some alternative embodiments. For example, two blocks that are consecutively illustrated may be performed substantially concurrently or may sometimes be performed in the reverse order, according to corresponding functions.

Here, the term "unit" used may indicate software or hardware elements such as a field-programmable gate array (FPGA) and an application-specific integrated circuit (ASIC), where the unit may perform any role. However, the term "unit" is not intended to be limited to software or hardware. The term "unit" may indicate an entity configured to reside in a storage medium that may be addressed, and may also indicate an entity configured to reproduce one or more processors. Accordingly, for example, the term "unit" includes elements such as software elements, object-oriented software elements, class elements, and task elements; processors, functions, attributes, procedures, subroutines, segments of program code, drivers, firmware, microcode, circuits, data, databases, data structures, tables, arrays, and variables. The functions provided in the elements and units may be combined with a smaller number of elements and units or may be further separated into additional elements and units. In addition, the elements and the units may also be implemented to reproduce one or more central processing units (CPUs) within a device or a security multimedia card. Further, in some embodiments, the term "unit" may indicate an entity that includes one or more processors.

A wireless communication system has been developed from a wireless communication system providing a voice-centered service in the early stage toward broadband wireless communication systems providing high-speed, high-quality packet data services compliant with communication standards, such as high-speed packet access (HSPA) and LTE or evolved universal terrestrial radio access (E-UTRA) of the third generation partnership project (3GPP), high-rate packet data (HRPD) and ultra-mobile broadband (UMB) of 3GPP2, 802.16e of the Institute of Electrical and Electronics Engineers (IEEE), and the like. In addition, the 5G or NR communication standards are being produced as the 5G wireless communication system.

As described above, in wireless communication systems including 5G, at least one service among enhanced mobile broadband (eMBB), massive machine-type communications (mMTC), and ultra-reliable and low-latency communications (URLLC) may be provided to at least one terminal. The above-described services may be provided to the same terminal during the same time period. In an embodiment, eMBB may be a service aiming at high-speed transmission of high-capacity data, mMTC may be a service aiming at terminal power minimization and access of multiple terminals, and URLLC may be a service aiming at high reliability and low latency, but the present disclosure is not intended to be limited thereto. The three services may be a main scenario in an LTE system or a system such as 5G and/or NR after the LTE system. In an embodiment, a description is provided of a method for coexistence between eMBB and URLLC or coexistence between mMTC and URLLC, and an apparatus using the same.

When a base station has scheduled, for any terminal, data corresponding to an eMBB service during a particular transmission time interval (TTI), if there occurs a situation where URLLC data must be transmitted during the TTI, a part of the eMBB data may not be transmitted in a frequency band in which the eMBB data is already scheduled and transmitted, but the generated URLLC data may be transmitted in the frequency band. A terminal for which the eMBB data has been scheduled and a terminal for which the URLLC data has been scheduled may be identical or different. In the example, since there occurs a situation where a part of the eMBB data having already been scheduled and transmitted is not actually transmitted, the possibility that the eMBB data will be corrupted becomes higher. Accordingly, in the example, it is necessary to determine a method for processing a received signal by the terminal for which the eMBB data has been scheduled or by the terminal for which the URLLC data has been scheduled, or a signal reception method thereof. Therefore, in an embodiment, a description is provided of a coexistence method between heterogeneous services for enabling transmission of information according to each service when a partial or entire frequency band is shared so as to schedule pieces of information (which may include data and control information) according to eMBB and URLLC; simultaneously schedule pieces of information according to mMTC and URLLC; simultaneously schedule pieces of information according to mMTC and eMBB; or simultaneously schedule pieces of information according to eMBB, URLLC, and mMTC.

Hereinafter, embodiments are described in detail with reference to the accompanying drawings. In the following description of the present disclosure, a detailed description of known functions or configurations incorporated herein are omitted when the same may make the subject matter of the present disclosure unclear. The terms described below are defined in consideration of the functions in the present disclosure, and may be different according to the intention or practice of users and operators. Therefore, the definitions of the terms should be made based on the contents throughout the present disclosure.

Hereinafter, a base station is a main agent performing resource allocation for a terminal, and may be at least one of a gNode B, an eNode B, a Node B, a base station (BS), a wireless access unit, a base station controller, and a node on a network. A terminal may include a user equipment (UE), a mobile station (MS), a cellular phone, a smart phone, a computer, or a multimedia system capable of performing a communication function. In the present disclosure, a downlink (DL) indicates a radio transmission path of a signal transmitted from a base station to a terminal, and an uplink (UL) indicates a radio transmission path of a signal transmitted from the terminal to the base station. In addition, an embodiment implemented based on an LTE or LTE-advanced (LTE-A) system is described below by way of example, but the present disclosure may be applied to other communication systems having a similar technical background or channel form. For example, 5G mobile communication technology, developed after LTE-A may be included in other communication systems. Further, according to the determination of those skilled in the art, embodiments may be applied to other communication systems through partial modification without departing from the scope of the present disclosure.

As a representative example of broadband wireless communication systems, an LTE system (hereinafter, examples of the LTE system may include LTE and LTE-A systems) adopts an orthogonal frequency division multiplexing (OFDM) scheme in a downlink, and adopts a single carrier frequency division multiple access (SC-FDMA) scheme in an uplink. The term "uplink" refers to a radio link through which a terminal transmits data or a control signal to a base station, and the term "downlink" refers to a radio link through which a base station transmits data or a control signal to a terminal. The above-described multiple access scheme normally allocates and operates time-frequency resources, which carry data or control information to be transmitted according to users, so as to prevent the time-frequency resources from overlapping each other, that is, establish orthogonality, thus making it possible to distinguish the data or control information of one user from another.

If a decoding failure occurs upon initial transmission, the LTE system adopts a hybrid automatic repeat request (HARQ) scheme for retransmitting the relevant data in a physical layer. If a receiver fails to accurately decode data, the HARQ scheme enables the receiver to transmit, to a transmitter, information (negative acknowledgement (NACK)) providing notification of the decoding failure so that the transmitter can retransmit the relevant data in the physical layer. The receiver combines the data retransmitted by the transmitter with the data of which the decoding has failed, thereby increasing reception performance of the data. In addition, if the receiver accurately decodes the data, information (acknowledgement (ACK)) providing notification of decoding success is transmitted to the transmitter so that the transmitter may transmit new data.

FIG. 1 is an illustration of a basic structure of a time-frequency domain, that is, a radio resource domain, in which data or control information is transmitted in a downlink of an LTE system and a system similar thereto.

Referring to FIG. 1, the horizontal axis represents the time domain and the vertical axis represents the frequency domain. A minimum transmission unit in the time domain is an OFDM symbol, in which one slot 106 is configured by collecting $N_{symb}$ OFDM symbols 102 and one subframe 105 is configured by collecting two slots. The length of the slot is 0.5 ms and the length of the subframe is 1.0 ms. In addition, a radio frame 114 is a time domain unit which includes 10 subframes. A minimum transmission unit in the frequency domain is a subcarrier, in which the entire system transmission bandwidth includes a total of $N_{BW}$ subcarriers 104. In this configuration, the specific values may be variably applied.

A basic unit of resources in the time-frequency domain is a resource element (RE) 112, and may be represented by an OFDM symbol index and a subcarrier index. A resource block (RB) (or a physical resource block (PRB)) 108 may be defined by the $N_{symb}$ consecutive OFDM symbols 102 in the time domain and $N_{RB}$ consecutive subcarriers 110 in the frequency domain. Accordingly, in one slot, one RB 108 may include $N_{symb} \times N_{RB}$ REs 112. Generally, a minimum allocation unit of data in the frequency domain is the RB unit. In the LTE system, generally, $N_{symb}=7$ and $N_{RB}=12$, and $N_{BW}$ may be proportional to a bandwidth of the system transmission band. A data rate is increased in proportion to the number of RBs scheduled for the terminal. The LTE system may define and operate six transmission bandwidths. In an FDD system which operates the downlink and uplink separated in the frequency domain, a downlink transmission bandwidth and an uplink transmission bandwidth may be different from each other. A channel bandwidth represents a radio frequency (RF) bandwidth corresponding to the system transmission bandwidth. Table 1 below shows a correspondence relationship between the system transmission bandwidth and a channel bandwidth that are defined in the LTE system. For example, in an LTE system having a channel bandwidth of 10 megahertz (MHz), a transmission bandwidth may include 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within the first N OFDM symbols within the subframe. In an embodiment, generally, N={1, 2, 3}. Accordingly, the value of N may be variably applied to each subframe, according to the amount of control information which must be transmitted in the current subframe. The control information to be transmitted may include a control channel transmission section indicator indicating over how many OFDM symbols the control information is transmitted, scheduling information on downlink data or uplink data, and information on HARQ ACK/NACK.

In the LTE system, scheduling information on downlink data or uplink data is delivered from a base station to a terminal through downlink control information (DCI). The DCI may be defined depending on various formats. According to each format, the DCI may indicate whether the DCI is scheduling information (UL grant) on the uplink data or scheduling information (DL grant) on the downlink data, whether the DCI is a compact DCI having small-sized control information, whether to apply spatial multiplexing using multiple antennas, whether the DCI is a DCI for power control, or the like. For example, DCI format 1, which is the scheduling control information (DL grant) on the downlink data, may include at least one piece of information among the following pieces of control information.

Resource allocation type 0/1 flag: this indicates whether a resource allocation scheme is type 0 or type 1. Type 0 applies a bitmap scheme so as to allocate a resource in a resource block group (RBG) unit. In the LTE system, a basic unit of scheduling is an RB, represented by a time-frequency domain resource, and an RBG includes multiple RBs, and thus becomes a basic unit of scheduling in the type 0 scheme. Type 1 allocates a certain RB within an RBG.
  Resource block assignment: this indicates an RB allocated to data transmission. The represented resource is determined according to a system bandwidth and a resource allocation scheme.
  Modulation and coding scheme (MCS): this indicates a modulation scheme used for data transmission and the size of a transport block (TB), that is, data to be transmitted.
  HARQ process number: this indicates a HARQ process number.
  New data indicator: this indicates a HARQ initial transmission or retransmission.
  Redundancy version: this indicates a redundancy version of data to be transmitted during transmission according to HARQ.
  Transmit power control (TPC) command for a physical uplink control channel (PUCCH): this indicates a transmit power control command for a PUCCH that is an uplink control channel.

The DCI may pass through a channel coding and modulation process and may then be transmitted through a physical downlink control channel (PDCCH) (or downlink control information transmitted through a PDCCH, which can be used interchangeably therewith below) or an enhanced PDCCH (EPDCCH) (or downlink control information transmitted through an EPDCCH, which can be used interchangeably therewith below).

Generally, the DCI is independently scrambled with a particular RNTI (which may be understood as a terminal identifier or a terminal ID) for each terminal so as to have a cyclic redundant check (CRC) bit added thereto, is channel-coded, and is then configured of independent PDCCH before being transmitted. In the time domain, the PDCCH is mapped and then transmitted during the control channel transmission section. A mapping location in the frequency domain of the PDCCH may be determined based on an identifier of each terminal and transmitted over the entire system transmission bandwidth.

The downlink data may be transmitted through a physical downlink shared channel (PDSCH) that is a physical channel for downlink data transmission. The PDSCH may be transmitted after the control channel transmission section, and scheduling information on a certain mapping location in the frequency domain, a modulation scheme, or the like may be determined based on the DCI transmitted through the PDCCH.

By using the MCS among the pieces of control information constituting the DCI, a base station provides notification of a modulation scheme applied to a PDSCH to be transmitted to a terminal and a size of data (transport block size (TBS)) to be transmitted. In an embodiment, the MCS may include 5 bits or more or less than 5 bits. The TBS corresponds to a size before channel coding for error correction is applied to data TB to be transmitted by a base station. Modulation schemes supported by LTE systems include quadrature phase shift keying (QPSK), 16QAM, and 64QAM, of which modulation orders Qms correspond to 2, 4, and 6, respectively. That is, in the case of QPSK modulation, 2 bits per symbol may be transmitted, in the case of the 16QAM modulation, 4 bits per symbol may be transmitted, and in the case of the 64QAM modulation, 6 bits per symbol may be transmitted. In addition, a modulation scheme above 256QAM may be used depending on system modification.

Figure 2:
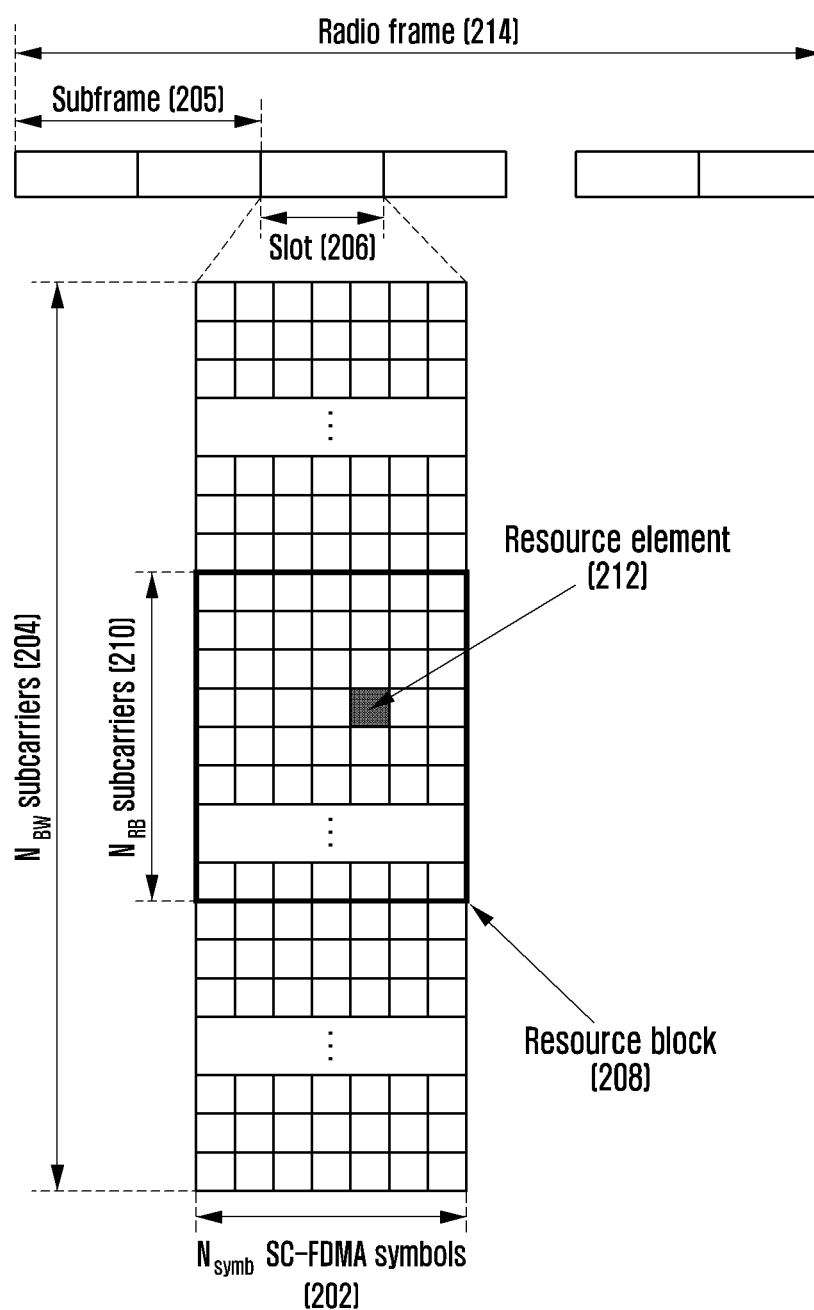
FIG. 2 is an illustration of a basic structure of a time-frequency domain, that is, a radio resource domain, in which data or control information is transmitted in an uplink of an LTE system and a system similar thereto.

FIG. 2 is an illustration of a basic structure of a time-frequency domain, that is, a radio resource domain, in which data or control information is transmitted in an uplink of an LTE system and a system similar thereto.

Referring to FIG. 2, the horizontal axis represents the time domain and the vertical axis represents the frequency domain. A minimum transmission unit in the time domain is an SC-FDMA symbol, and may configure one slot 206 by collecting $N_{symb}$ SC-FDMA symbols 202. In addition, one subframe 205 is configured by collecting two slots. One radio frame 214 is configured by collecting 10 subframes. A minimum transmission unit in the frequency domain is a subcarrier, in which an entire system transmission bandwidth 204 includes a total of $N_{BW}$ subcarriers 204. $N_{BW}$ may have a value proportional to the system transmission bandwidth.

A basic unit of resources in the time-frequency domain is an RE 212, and may be defined by an SC-FDMA symbol index and a subcarrier index. An RB 208 may be defined by $N_{symb}$ consecutive SC-FDMA symbols in the time domain and $N_{RB}$ consecutive subcarriers 210 in the frequency domain. Accordingly, one RB includes $N_{symb} \times N_{RB}$ REs. In general, a minimum transmission unit of data or control information is an RB unit. A PUCCH is mapped to a frequency domain corresponding to one RB and transmitted in one subframe.

In the LTE system, it is possible to define a timing relationship of a PUCCH or a PUSCH, that is, an uplink physical channel, through which a HARQ ACK/NACK corresponding to a PDSCH as a physical channel for downlink data transmission or a PDCCH or EPDDCH including a semi-persistent scheduling release (SPS release) is transmitted. For example, in an LTE system operating according to frequency division duplex (FDD), HARQ ACK/NACK corresponding to the PDSCH transmitted in an n−4-th subframe or PDCCH, or EPDCCH including the SPS release may be transmitted through the PUCCH or the PUSCH in an n-th subframe.

In the LTE system, a downlink HARQ adopts an asynchronous HARQ scheme in which a data retransmission time point is not fixed. That is, if, for initial transmission data transmitted by the base station, the HARQ NACK is fed back from the terminal, the base station freely determines a transmission time point of data to be retransmitted on the basis of a scheduling operation. The terminal may perform buffering on data determined as an error as a result of decoding the received data for a HARQ operation, and then may perform combining with data to be retransmitted next.

If the terminal receives a PDSCH including downlink data transmitted from the base station in subframe n, the terminal transmits uplink control information including a HARQ ACK or a NACK of the downlink data to the base station through a PUCCH or PUSCH in subframe n+k. For example, k may be defined differently depending on whether the LTE system adopts FDD or time division duplex (TDD), and a UL/DL subframe configuration thereof. For example, in the case of an FDD LTE system, k is fixed to 4. In the case of a TDD LTE system, k may depend on a subframe configuration and a subframe number. In addition, when data is transmitted through multiple carriers, the value of k may be applied differently depending on a TDD configuration of each carrier.

In the LTE system, unlike a downlink HARQ, an uplink HARQ adopts a synchronous HARQ scheme in which a data transmission time point is fixed. That is, an uplink/downlink timing relationship of a physical uplink shared channel (PUSCH), which is a physical channel for uplink data transmission, a PDCCH, which is a downlink control channel preceding the PUSCH, and a physical hybrid indicator channel (PHICH), which is a physical channel through which a downlink HARQ ACK/NACK corresponding to the PUSCH is transmitted, may be determined by the following rules.

If, in the subframe n, the terminal receives a PDCCH including uplink scheduling control information transmitted from the base station or a PHICH through which a downlink HARQ ACK/NACK is transmitted, the terminal transmits uplink data corresponding to the control information through a PUSCH in subframe n+k. For example, k may be defined differently depending on whether the LTE system adopts FDD or TDD, and a subframe configuration thereof. For example, in the case of the FDD LTE system, k is fixed to 4. In the case of the TDD LTE system, k may depend on a subframe configuration and a subframe number. In addition, when data is transmitted through multiple carriers, the value of k may be applied differently depending on a TDD configuration of each carrier.

In addition, if the terminal receives a PHICH including information related to the downlink HARQ ACK/NACK from the base station in subframe the PHICH corresponds to a PUSCH that the terminal transmits in subframe i–k. For example, k may be defined differently depending on the FDD or the TDD of the LTE system and the subframe configuration thereof. For example, in the case of the FDD LTE system, k is fixed to 4. In the case of the TDD LTE system, k may depend on the subframe configuration and the subframe number. In addition, when data is transmitted through multiple carriers, the value of k may be applied differently depending on a TDD configuration of each carrier.

TABLE 2

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
|  | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmission, port 7 and 8 (see subclause 7.1.5A) or single-antenna port, port 7 or 8 (see subclause 7.1.1) |

Table 2 above describes supportable DCI format types according to each transmission mode in conditions configured by C-RNTI included in 3GPP TS 36.213. A terminal performs search and decoding on the assumption that a relevant DCI format exists in a control space section according to a pre-configured transmission mode. For example, when the terminal receives transmission mode 8 as an indication, the terminal searches for a DCI format 1A in a common search space and a UE-specific search space, and searches for a DCI format 2B only in the UE-specific search space.

The description of the wireless communication system has been made with reference to the LTE system, but the present disclosure is not limited to the LTE system, and, thus, may be applied to various wireless communication systems, including NR, 5G, and the like. In addition, in an embodiment, when applied to another wireless communication system, the above-described value of k may be changed and applied even to a system using a modulation scheme corresponding to FDD.

Figure 3:
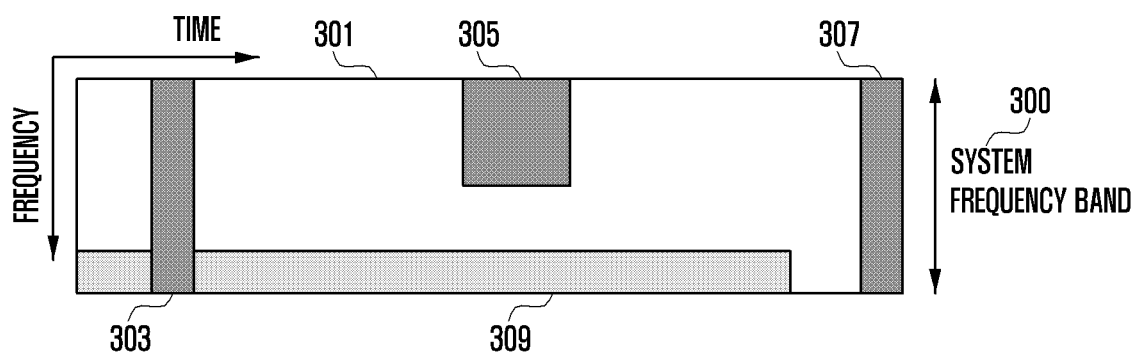
FIG. 3 is an illustration of assigning a first data type, a second data type, and a third data type, which are services considered in a 5G or new radio (or next radio) (NR) system, in a frequency-time resource.
Figure 4:
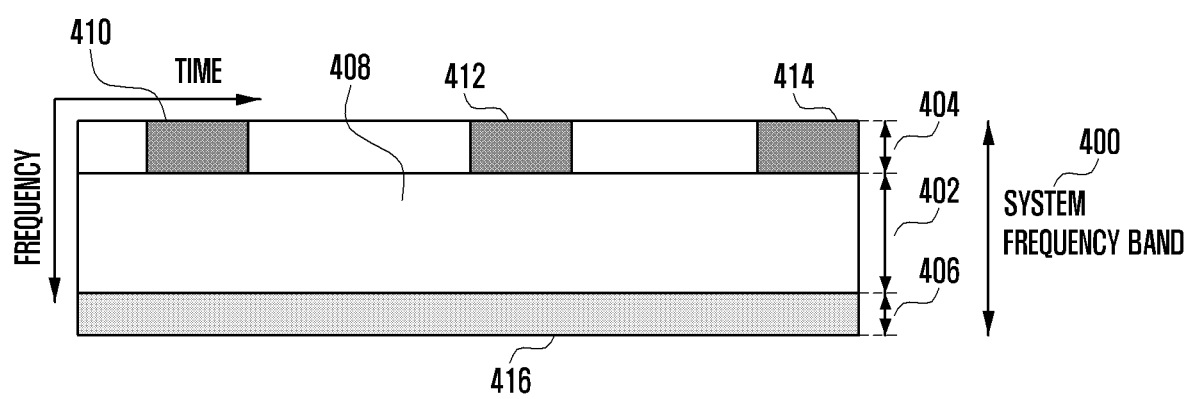
FIG. 4 is an illustration of assigning a first data type, a second data type, and a third data type, which are services considered in a 5G or NR system, in a frequency-time resource.

FIGS. 3 and 4 are illustrations of assigning a first data type, a second data type, and a third data type, which are services considered in a 5G or NR system, in a frequency-time resource.

Referring to FIG. 3, a first-type data 301, a second-type data 303, 305, and 307, and a third-type data 309 are assigned in an entire system frequency band 300. If second-type data 303, 305, and 307 are generated and need to be transmitted while first-type data 301 and third-type data 309 are assigned and transmitted in a particular frequency band, a transmitter may empty the part in which the first-type data 301 and the third-type data 309 are already assigned, or may transmit the second-type data 303, 305, and 307 without transmitting the part in which the first-type data 301 and the third-type data 309 are already assigned. Since the second-type data 303, 305, and 307 among the services must reduce a delay time, the second-type data 303, 305, and 307 may be allocated a part of a resource allocated to the first-type data 301, and may then be transmitted. If the second-type data 303, 305, and 307 is additionally allocated to a resource allocated to the first-type data 301 and is transmitted on the allocated resource, the first-type data 301 may not be transmitted on an overlapping frequency-time resource, and, thus, the transmission performance of the first-type data 301 may become lower. That is, for example, due to the assignment of the second-type data 303, 305, and 307, a transmission failure of the first-type data 301 may occur.

For example, the first-type data 301 may correspond to eMBB, the second-type data 303, 305, and 307 may correspond to URLLC, and the third-type data 309 may correspond to mMTC.

Referring to FIG. 4, an entire system frequency band 400 may be divided into sub-bands 402, 404, and 406, and each sub-band may be used to transmit a service and data. Information related to the sub-band configuration may be predetermined, and a base station may transmit the related information to a terminal through higher signaling. Alternatively, the information related to the sub-band configuration may be arbitrarily determined by the base station or a network node, and service may be provided without transmitting separate sub-band configuration information to the terminal. FIG. 4 illustrates a case in which a sub-band 402 is used to transmit first-type data 408, a sub-band 404 is used to transmit second-type data 410, 412, and 414, and a sub-band 406 is used to transmit third-type data 416.

In the present disclosure, the length of a TTI used to transmit the second-type data 410, 412, and 414 may be less than that of a TTI used to transmit the first-type data 408 or third-type data 416. In addition, a transmitter may transmit a response of information related to the second-type data 410, 412, and 414 faster than in the case of transmission of a response of information related to the first-type data 408 or third-type data 416, and, thus, may transmit or receive information with low latency.

A first-type data service described below is referred to as a first-type service and data for a first-type service is referred to as first-type data. The first-type service or the first-type data is not limited to eMBB, but may also correspond to a case in which high-rate data transmission is required or broadband transmission is performed. In addition, a second-type data service is referred to as a second-type service and data for a second-type service is referred to as a second-type data. The second-type service or the second-type data is not limited to URLLC, but may also be correspond to a case in which a short delay time is required or high-reliability transmission is needed, or may correspond to even another system which requires not only a short delay time but also high reliability. Further, a third-type data service is referred to as a third-type service and data for a third-type service is referred to as third-type data. The third-type service or the third-type data is not limited to mMTC, but may also correspond to a case in which a low speed, wide coverage, low power, or the like is required. In addition, when an embodiment is described, the first-type service may be understood as including the third-type service or not including the same.

Structures of physical layer channels used according to the respective types in order to transmit the three kinds of services or data may be different. For example, there may be a difference in at least one of the length of one OFDM or discrete Fourier transform-spread-OFDM (DFT-S-OFDM) symbol, the length of a TTI, an allocation unit of frequency resources, a structure of a control channel, and a method for mapping data.

In the above-described configuration, the three types of services and the three types of data have been described, but more types of services and data corresponding to the service types may exist, and the present disclosure may be applied to such examples.

In the present disclosure, the terms "physical channel" and "signal" in the conventional LTE or LTE-A system may be used. However, the contents of the present disclosure may be applied to a wireless communication system other than the LTE and LTE-A systems.

As described above, the 5G system requires a method for satisfying a maximum delay time. Specifically, when a base station allocates uplink or downlink data resources to a terminal supporting an eMBB service, there may occur a situation where, before performing actual transmission, the base station must reallocate the allocated resources for terminals supporting a URLLC service which requires a delay time less than that of the eMBB service. In the case of a downlink, the base station may selectively operate data assignment and transmission/reception, for terminals supporting a URLLC service either before or after allocation of the relevant resources. However, in the case of an uplink, if separate signaling for terminals supporting the eMBB service does not exists, a terminal may transmit data to a base station on a pre-allocated uplink resource, and thus, the data transmitted by the terminal supporting the eMBB service interferes, from the perspective of the base station, with data transmitted by a terminal that supports the URLLC service and is allocated an uplink resource which is the same as, or partially overlaps, the pre-allocated uplink resource. Therefore, it is necessary to appropriately deal with this interference.

The present disclosure may be applied to FDD and TDD systems.

Hereinafter, higher signaling is a signal delivery method for delivering information from a base station to a terminal through a downlink data channel of a physical layer, or delivering information from a terminal to a base station through an uplink data channel of the physical layer, and may be radio resource control (RRC) signaling, packet data convergence protocol (PDCP) signaling, or a medium access control (MAC) control element (MAC CE).

In the present disclosure, a terminal may be a receiver and a base station may be a transmitter on a downlink channel, and a terminal may be a transmitter and a base station may be a receiver on an uplink channel. In addition, a downlink control channel in the present disclosure may correspond to at least one of a cell-common downlink control channel, a UE-common downlink control channel, and a UE-specific downlink control channel. In addition, downlink control information in the present disclosure may correspond to at least one piece of information among cell-common downlink control information, UE-common downlink control information, and UE-specific downlink control information. Further, higher signaling in the present disclosure may correspond to at least one of cell-common higher signaling and UE-specific higher signaling.

In the present disclosure, the downlink control, data information, and/or channel may also be sufficiently applied to uplink channel control, data information, and/or channel.

Figure 5:
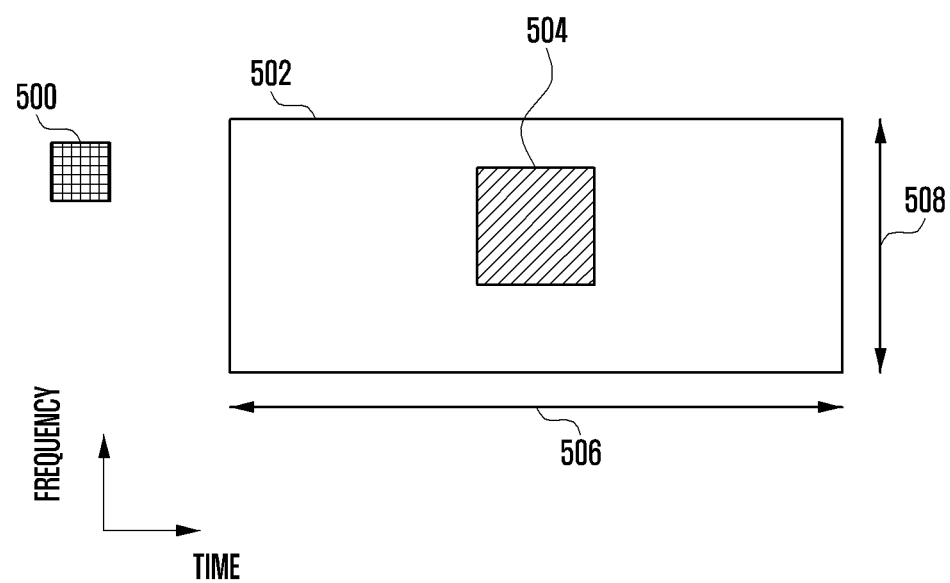
FIG. 5 is an illustration of a method for receiving control information and transmitting (or receiving) data by a terminal.

FIG. 5 is an illustration of a method for receiving control information and transmitting (or receiving) data by a terminal.

Referring to FIG. 5, the terminal may receive, on a downlink control channel 500, information indicating which resource domain corresponds to a resource 504 on which uplink transmission (or downlink reception) cannot be performed in a pre-configured frequency resource domain section 508 and a pre-configured time resource domain section 506 through a downlink control information search. The information indicating which resource corresponds to a resource on which uplink transmission cannot be performed may indicate at least a part of a resource 502 defined by the pre-configured frequency resource domain section 508 and time resource domain section 506. The downlink control information may include a CRC bit scrambled with a separate RNTI different from a cell RNTI (C-RNTI), a paging RNTI (P-RNTI), a system information RNTI (SI-RNTI), and the like.

The above-described control information may be located in a resource preceding the resource 502 defined by the pre-configured frequency resource domain section 508 and time resource domain section 506. The control information may indicate a part of the predefined resource 502 which is adjacent to a control information resource (which is closest on the time axis after the control information resource). Alternatively, the control information may indicate a part of a predefined resource which is adjacent to the next control information resource in consideration of a processing time, and which part of a predefined resource is indicated by the control information may be configured by higher signaling or L1 signaling.

The frequency resource domain section 508 may be identical to an uplink bandwidth part (BWP) pre-configured for the terminal, or may be configured by separate higher signaling. In the example, the frequency resource domain section 508 may include a start point and an end point thereof; a start point and the length of a resource domain; and the like. As illustrated in FIG. 5, the predefined resource 502 may have one frequency resource domain section, or may be configured to have at least two frequency resource domain sections. A unit of frequency resource domain section may be an RB unit or an RB group unit related to a reference subcarrier interval pre-configured for the terminal.

The time resource domain section 506 may be identical to, or different from, the length of a cycle of the control channel 500 through which the terminal monitors the downlink control information. In the example, a start point of the time resource domain section may correspond to a start symbol value or an end symbol value of a downlink control channel domain in which the downlink control information is transmitted, or may correspond to a symbol value immediately after the end of the downlink control channel domain. An end point of the time resource domain section, which may be indicated by the interruption information, may correspond to a symbol value immediately before the start of, or a symbol value immediately before the end of, a downlink control channel domain in which the next interruption information may be transmitted, or may correspond to a symbol value immediately before the end of a downlink control domain. Alternatively, the end point of the time resource domain section may be started or finished at any time point between control channel resources that the terminal needs to monitor. Specifically, the time resource domain section 506 may be configured using one, two, or four slot lengths according to a particular subcarrier interval and a particular cyclic-prefix configuration, and other values are possible. In addition, as illustrated in FIG. 5, the predefined resource 502 may have one time resource domain section, or may have multiple non-consecutively configured time resource domains.

Although there exists an uplink transmission resource or a downlink reception resource pre-configured for the terminal in the resource domain 504 indicated by the downlink control information received through the UE-specific or UE-common downlink control channel 500, the terminal does not transmit data in the uplink or does not receive data in the downlink (or does not expect to transmit data in the uplink or receive data in the downlink, or cancels or drops uplink data transmission) in a relevant time resource domain (or a time resource and frequency resource domain). That is, the terminal may receive downlink data or transmit uplink data (or may expect to receive downlink data or transmit uplink data) only in a resource domain in which the resource domain 504 does not overlap the time resource domain or the time and frequency resource domain. This operation may be identically applied to downlink control information and uplink control information.

For example, if data is transmitted only in the remaining resource domain except an overlapping resource domain, it is possible to perform puncturing or rate matching in a data-mapping scheme. A puncturing scheme (all of time or time and frequency resources) is a scheme for transmitting or receiving data except bits belonging to an overlapping resource domain. A rate-matching scheme is a scheme for re-mapping data to a non-overlapping resource domain and then transmitting or receiving the relevant data. It is possible to separately configure which scheme is to be used among the rate matching scheme and the puncturing scheme, by higher signaling or L1 signaling (which may be downlink control information), or one scheme among the schemes may always be applied. Alternatively, the rate matching or the puncturing scheme may be implicitly applied, and which scheme is to be used may be determined depending on a ratio of an allocated data resource (all of time or time and frequency resources) to an overlapping resource domain, a time difference between a time point at which data is received through the control channel 500 and a time point at which data is actually received or transmitted, a minimum processing time required by a terminal, a data type, or the like.

Alternatively, the terminal, which receives configuration of a resource (for data transmission) at least partially overlapping the resource domain 504 in the time resource domain or the time and frequency resource domain, may not expect to use the relevant configured resource (data transmission in the case of an uplink resource or data reception in the case of a downlink resource).

In the present disclosure, control information transmitted through the downlink control channel 500 may be referred to as a URLLC preemption indicator, an (uplink or downlink) interruption indicator (which can be interchangeably used with interruption indicator information or interruption information), a transmission or reception stop indicator, or the like, and may be referred to by other terms.

When the terminal receives and identifies relevant indicator information before actually transmitting or receiving a signal, or while transmitting or receiving a signal, on a resource in relation to all of the downlink or uplink resources granted to the terminal such as downlink data, uplink data, or an uplink control channel transmission pre-scheduled for the terminal, the above-described indicator serves to indicate, to the terminal, that the terminal expects not to transmit or receive data in a physical channel resource domain part (or a physical channel resource domain part overlapping a time and frequency resource domain) which temporally overlaps a resource domain indicated by the relevant indicator information. Alternatively, when the terminal receives and identifies relevant indicator information before actually transmitting or receiving a signal, or while transmitting or receiving a signal, on a resource in relation to all of the downlink or uplink resources granted to the terminal such as downlink data, uplink data, or an uplink control channel transmission pre-scheduled for the terminal, the indicator serves to indicate, to the terminal, that the terminal expects not to transmit or receive all transport blocks (or a granted resource domain) including a physical channel resource domain part (or a physical channel resource domain part overlapping a time and frequency resource domain) which only temporally overlaps a resource domain indicated by the relevant indicator information.

Alternatively, when the terminal receives the indicator information indicating resource information on a resource, which does not overlap an uplink or downlink resource domain previously scheduled (or granted) for the terminal by the base station, and identifies the resource information, the terminal may transmit uplink data or may receive downlink data in the resource domain previously scheduled for the terminal (or may expect to transmit uplink data or receive downlink data).

In the case of downlink data reception or uplink data transmission, if data transmission/reception is not performed according to the control information, the base station may subsequently again provide a grant to the terminal through a downlink control channel, and may transmit or receive data, which has not been transmitted or received, through this configuration. However, uplink control information is not transmitted on the basis of this grant. Therefore, when uplink control information is transmitted or piggybacks on an uplink data channel and is then transmitted thereon, if transmission/reception of control information has not been performed according to the control information, the base station may again provide a grant, which requests uplink control information, to the terminal in the relevant resource domain. Alternatively, without a grant, the terminal may transmit the control information, which has not been transmitted by the terminal, to the base station in a delayed resource domain previously determined (configured) by higher signaling.

The control information may be transmitted through a UE-specific control channel, a UE-group-common control channel, or a control channel shared by all of the terminals. In addition, the control information may be configured while a bandwidth period is configured, and may be configured for each carrier (or cell). In addition, the control information may simultaneously include information on multiple carriers. For example, first interruption indicator information on a first carrier and second interruption indicator information on a second carrier may be included in the same control information and may then be transmitted. This configuration may be a method applicable to a terminal configured to perform cross-carrier scheduling.

Figure 6:
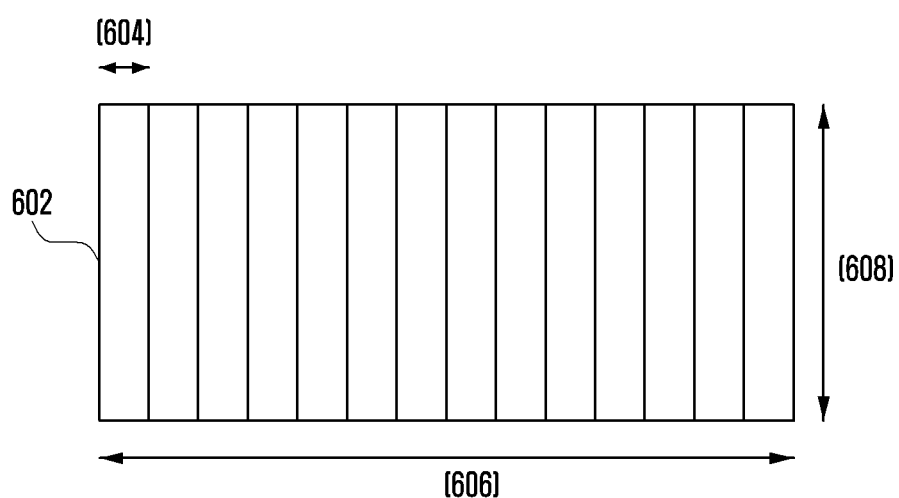
FIG. 6 is an illustration of configuring an interruption indicator according to an embodiment.
Figure 6:
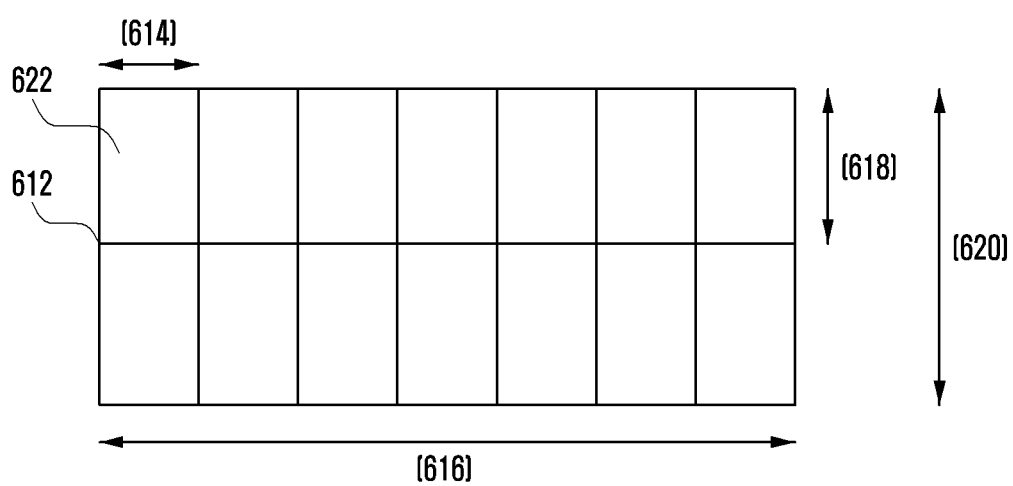

FIG. 6 is an illustration of configuring an interruption indicator.

Referring to FIG. 6, a first scheme 602 is a method for providing only time resource information by using interruption indicator information. An indicator may include information indicating whether to stop transmission/reception in a particular time resource domain (e.g., a symbol group including one symbol or multiple (consecutive or non-consecutive) symbols) 604 according to a bitmap scheme with respect to a pre-configured time resource domain section 606 and a pre-configured frequency resource domain section 608. Time resource domain sections indicated by respective bits included in a bitmap may all have the same size, or may be configured to have a one- (or two-) symbol difference. For example, each bit may indicate one symbol, two symbols, or four symbols, and the specific number of symbols may change. In addition, the number of symbols indicated by the last bit may change. Alternatively, the number of symbols indicated by the last bit may be determined based on a relationship between a time resource domain length T and a size n of interruption indicator information of one carrier. That is, one bit constituting the indicator information may indicate interruption information on $\lceil T/n \rceil$ consecutive symbols 604, or may indicate interruption information on $\lfloor T/n \rfloor$ consecutive symbols 604. For example, the first to (n−1)-th bits may indicate $\lceil T/n \rceil$ or $\lfloor T/n \rfloor$ symbols, and the n-th bit may indicate T−(n−1) $\lceil T/n \rceil$ or T−(n−1) $\lfloor T/n \rfloor$ symbols.

A second scheme 612 is a method for providing time and frequency resource information by using interruption indicator information. An indicator may include information indicating whether to stop transmission/reception in a particular time resource domain (e.g., a symbol group including one symbol or multiple (consecutive or non-consecutive) symbols) and a particular frequency resource domain (e.g., a value configured in a (consecutive or non-consecutive) PRB group unit or a value obtained by dividing, by n, a frequency resource domain section 620 identical to, or different from, a pre-configured bandwidth frequency period) with respect to a pre-configured time resource domain section 616 and a pre-configured frequency resource domain section 620. That is, a resource may be divided into a lattice structure as indicated by reference numeral 622, and thus, one bit may provide information on a resource configured using a time and frequency resource domain. In addition, a bit indicating time resource information may differ from a bit indicating frequency resource information. For example, interruption indicator information may be configured such that a bit indicating a time resource and a bit indicating frequency resource information are adjacent to each other, and the order, in which the bit indicating a time resource and the bit indicating frequency resource information are arranged, may be changed.

Time resource domain sections indicated by respective bits may all have the same size, or may be configured to have a one- (or two or more-) symbol difference. Alternatively, the configuration of time resource domain sections indicated by respective bits may be determined based on a relationship between a time resource domain length T 616 and a size n or n/2 of interruption indicator information of one carrier. That is, one bit constituting the indicator information may indicate interruption information on $\lceil T/n \rceil$ consecutive symbols 604, or may indicate interruption information on $\lfloor T/n \rfloor$ consecutive symbols 604. If time resource information is indicated by n bits, in the example, the first to (n−1)-th bits may indicate $\lceil T/n \rceil$ or $\lfloor T/n \rfloor$ symbols, and the n-th bit may indicate T−(n−1) $\lceil T/n \rceil$ or T−(n−1) $\lfloor T/n \rfloor$ symbols. Alternatively, if n is the total number of bits configured for an interruption indicator, "a" is the total number of symbols included in one slot, and T is the total number of symbols related to time resource domains which may be indicated by an interruption indicator, each of a (T−$\lfloor T/a \rfloor$×a) number of bits among n bits may indicate $\lceil T/a \rceil$ or $\lceil T/n \rceil$ symbols, and each of an (n−T+$\lfloor T/a \rfloor$×a) number of bits, which are the remaining bits, may indicate $\lfloor T/a \rfloor$ or $\lfloor T/n \rfloor$ symbols. The order of the bits may be changed so that a bit indicating a smaller number of symbols may be arranged first.

Frequency resource domain sections indicated by respective bits may all have the same size, or may be configured to have a one- (or two or more-) RB difference. Alternatively, each of the frequency resource domain sections may have a value obtained by dividing a frequency resource domain size F 620 by 2 (or n). For example, in FIG. 6, 618 is the size of a frequency resource domain which may be indicated by one bitmap, and may become $\lceil F/2 \rceil$ or $\lfloor F/2 \rfloor$. To further generalize, if a frequency domain is divided into n parts, the first to (n−1)-th bits among n bits indicating a frequency resource may indicate $\lceil F/n \rceil$ or $\lfloor F/n \rfloor$ RBs, and the n-th bit may indicate T−(n−1) $\lceil F/n \rceil$ or T−(n−1) $\lfloor F/n \rfloor$ RBs.

For example, if n is the total number of bits configured for an interruption indicator, "a" is a value obtained by dividing by 2 the total number of symbols included in one slot, and T is the total number of symbols related to time resource domains which may be indicated by an interruption indicator (here, n and "a" are both considered to be even numbers), each of a (T−$\lfloor T/a \rfloor \times a$) number of bits in relation to a first ceiling function $\lceil F/2 \rceil$ or first floor function $\lfloor F/2 \rfloor$ frequency section among first n/2 bits in a time and frequency resource domain section indicated by each bit may indicate $\lceil T/a \rceil$ or $\lceil T/n \rceil$ symbols, and each of an (n/2−T+$\lfloor T/a \rfloor \times a$) number of bits, which are the remaining bits, may indicate $\lfloor T/a \rfloor$ or $\lfloor T/n \rfloor$ symbols. In addition, a (T−$\lfloor T/a \rfloor \times a$) number of bits, which are the first bits, in relation to the remaining ceiling function $\lceil F/2 \rceil$ or remaining floor function $\lfloor F/2 \rfloor$ frequency sections among the remaining n/2 bits may indicate $\lceil T/a \rceil$ or $\lceil T/n \rceil$ symbols, and an (n/2−T+$\lfloor T/a \rfloor \times a$) number of bits, which are the remaining bits, may indicate $\lfloor T/a \rfloor$ or $\lfloor T/n \rfloor$ symbols. Although n and "a" are odd numbers, a similar scheme may be easily applied and used.

A unit of T may be a symbol unit or a symbol group unit. A unit of F may be an RB unit or an RB group unit.

For example, the scheme to be applied among the first and second schemes may be configured by higher signaling, or may be adaptively indicated by L1 signaling including higher signaling. Pieces of information according to the two schemes may have the same bit size or may have different bit sizes. In FIG. 6, consideration is given to a case in which the pieces of information according to the two schemes both have 14 bitmaps per bandwidth period per particular carrier. If the time resource domain 606 or 616 corresponds to one symbol including 14 symbols and the frequency resource domain 608 or 620 is identical to the frequency bandwidth period, according to the first scheme, one bit may indicate interruption information on one symbol in relation to the frequency bandwidth period configured for the terminal. According to the second scheme, one bit may indicate interruption information on two consecutive symbols among the bisected domains (or a domain after being corrected using a ceiling function $\lceil F/2 \rceil$ (or a floor function $\lfloor F/2 \rfloor$)) in relation to the frequency bandwidth period configured for the terminal.

The terminal may receive configuration of whether a search for interruption information is made, using higher signaling. Control information including the interruption information may include CRC information scrambled with a particular RNTI. It is possible to configure, using higher signaling, a resource domain in which the relevant interruption information is transmitted, set information of particular cells, information providing notification of how the relevant interruption information is associated with a particular cell (interruption indicator information may include interruption information on multiple cells, and in this configuration, information indicating which cell's interruption information is included in the interruption indicator information), size information or search cycle information of interruption information, information on a time and frequency configuration indicated by a bit included in interruption information, or combination information of the above-described pieces of information.

When the terminal receives the relevant interruption information, in only the overlapping part of a time resource domain or the overlapping part of a time and frequency resource domain, which is indicated by the relevant interruption information in a scheduled resource domain, the terminal may not perform uplink data transmission (or control information transmission) in the case of uplink scheduling, or may not perform downlink data reception in the case of downlink scheduling.

Alternatively, when the terminal receives the relevant interruption information, in an entire scheduled resource domain (or a resource domain allocated a particular TB) including the at least partially overlapping part of a time resource domain or the at least partially overlapping part of a time and frequency resource domain, which is indicated by the relevant interruption information in a scheduled resource domain, the terminal may not perform uplink data transmission (or control information transmission) in the case of uplink scheduling, or may not perform downlink data reception in the case of downlink scheduling.

Alternatively, when the terminal receives the relevant interruption information, in a slot including the at least partially overlapping part of a time resource domain or the at least partially overlapping part of a time and frequency resource domain, which is indicated by the relevant interruption information, the terminal may not perform uplink data transmission (or control information transmission) in the case of uplink scheduling, or may not perform downlink data reception in the case of downlink scheduling.

Alternatively, when the terminal receives the relevant interruption information in a situation where repeated transmission or multiple multi-slot transmissions are scheduled for the terminal, in a slot including the at least partially overlapping part of a time resource domain or the at least partially overlapping part of a time and frequency resource domain, which is indicated by the relevant interruption information, the terminal may not perform uplink data transmission (or control information transmission) in the case of uplink scheduling, or may not perform downlink data reception in the case of downlink scheduling.

Alternatively, when the terminal receives the relevant interruption information in a situation where repeated transmission or multiple multi-slot transmissions are scheduled for the terminal, if there exists a scheduled slot including the at least partially overlapping part of a time resource domain or the at least partially overlapping part of a time and frequency resource domain, which is indicated by the relevant interruption information, in an entire slot for which the repeated transmission is scheduled, the terminal may not perform uplink data transmission (or control information transmission) in the case of uplink scheduling, or may not perform downlink data reception in the case of downlink scheduling.

Alternatively, when the terminal receives the relevant interruption information in a situation where repeated transmission or multiple multi-slot transmissions are scheduled for the terminal, if there exists a scheduled slot including the at least partially overlapping part of a time resource domain or the at least partially overlapping part of a time and frequency resource domain, which is indicated by the relevant interruption information, in the slot (and all of the following slots for which the same control information is scheduled), the terminal may not perform uplink data transmission (or control information transmission) in the case of uplink scheduling, or may not perform downlink data reception in the case of downlink scheduling.

Alternatively, when the terminal receives the relevant interruption information in a situation where repeated transmission is scheduled for the terminal, if there exists a slot including the at least partially overlapping part of a time resource domain or the at least partially overlapping part of a time and frequency resource domain, which is indicated by the relevant interruption information, wherein the slot is a slot in which data transmission according to a particular RV value (e.g., 0 or 3) is performed, the terminal may not perform uplink data transmission in the case of uplink scheduling, or may not perform downlink data reception in the case of downlink scheduling.

Alternatively, when the terminal receives the relevant interruption information in a situation where repeated transmission is scheduled for the terminal, if there exists a slot including the at least partially overlapping part of a time resource domain or the at least partially overlapping part of a time and frequency resource domain, which is indicated by the relevant interruption information, wherein the slot is the first slot in scheduling for the repeated transmission, the terminal may not perform uplink data transmission (or control information transmission) in all of the slots, for which the repeated transmission is scheduled, in the case of uplink scheduling, or may not perform downlink data reception in all of the slots, for which the repeated transmission is scheduled, in the case of downlink scheduling.

Alternatively, when the terminal receives the relevant interruption information in a situation where repeated transmission is scheduled for the terminal, the terminal may not perform downlink data reception or uplink data transmission only in a slot (or a particular transmission interval) including the at least partially overlapping part of a time resource domain or the at least partially overlapping part of a time and frequency resource domain, which is indicated by the relevant interruption information.

Figure 7:
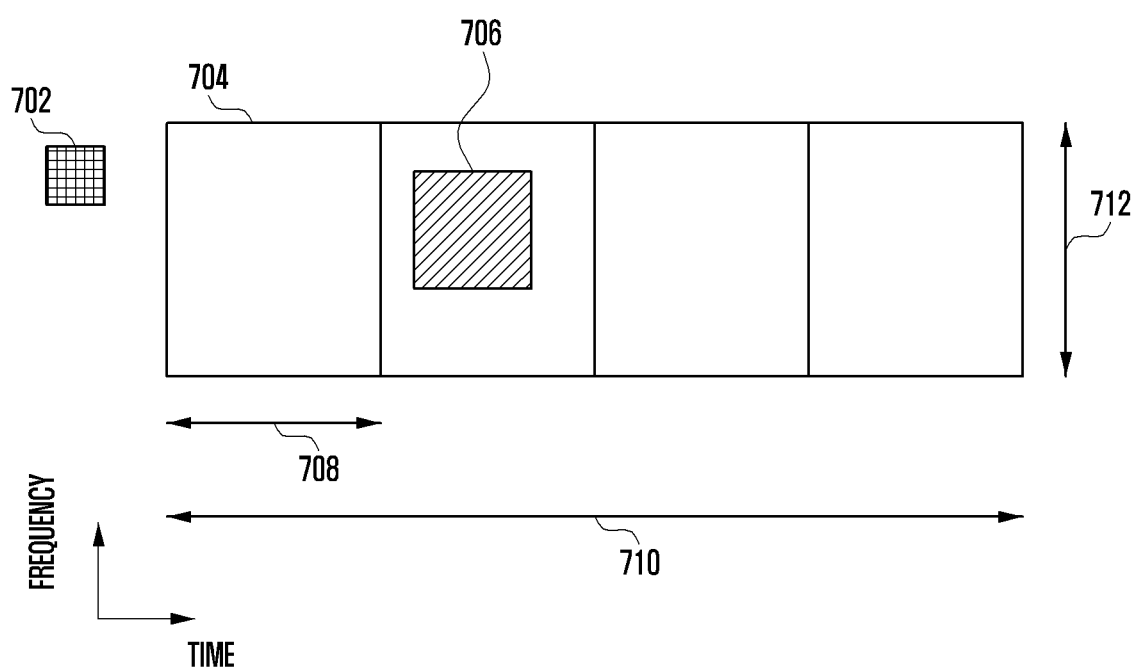
FIG. 7 is an illustration of a terminal receiving interruption information in a situation where the terminal is subjected to multiple-slot scheduling according to an embodiment.

FIG. 7 is an illustration in which a terminal receives interruption information in a situation where the terminal is subjected to multiple-slot scheduling.

Referring to FIG. 7, the terminal may receive, as one piece of control information, scheduling for one or at least two slots 704 through a UE-common or UE-specific control channel. Allocation of a time resource domain to the at least two configured slots is identical. That is, if uplink data is transmitted only in second to seventh symbols in a first slot, uplink data may be transmitted only in second to seventh symbols in a second slot. That is, if the terminal is subjected to multi-scheduling for N (in FIG. 7, N is 4) or more consecutive or non-consecutive slots, downlink data time resource domains or uplink data time resource domains respectively allocated to the relevant scheduled slots 708 may all be identical from the perspective of a symbol index. Multiple-slot scheduled frequency resource domain sections 712 are illustrated as being all identical, but frequency resource domain sections of the respective slots may be different from each other. In addition, multi-scheduled time resource domain sections 710 are illustrated as being continuous, but may be discontinuously allocated from the perspective of time resources.

The terminal receives interruption indicator information through a control channel 702, and a resource domain 706 indicated by the relevant interruption indicator information overlaps a partial resource domain of a second slot in a resource domain pre-scheduled for the terminal. For example, the terminal may not transmit or receive only a TB allocated to the relevant overlapping second slot (or may expect not to transmit or receive only a TB). Alternatively, if code-block-group-based retransmission is configured by higher signaling, the terminal may receive or transmit data on remaining resources except a physical channel resource domain in which time resources overlap each other (or time and frequency resources overlap each other) in a resource domain indicated by an interruption indicator. In addition, the terminal may not transmit or receive all TBs (or may expect not to transmit or receive all TBs) allocated to the relevant overlapping second slot and the following slots scheduled by the same control information as that of the second slot. That is, the terminal may not transmit or receive data in the second slot, the third slot, and the fourth slot. Alternatively, the terminal may not transmit or receive all TBs (or may expect not to transmit or receive all TBs) allocated to the relevant overlapping second slot and all of the slots scheduled by the same control information as that of the second slot. That is, the terminal may not transmit or receive data in the first to fourth slots.

Figure 8:
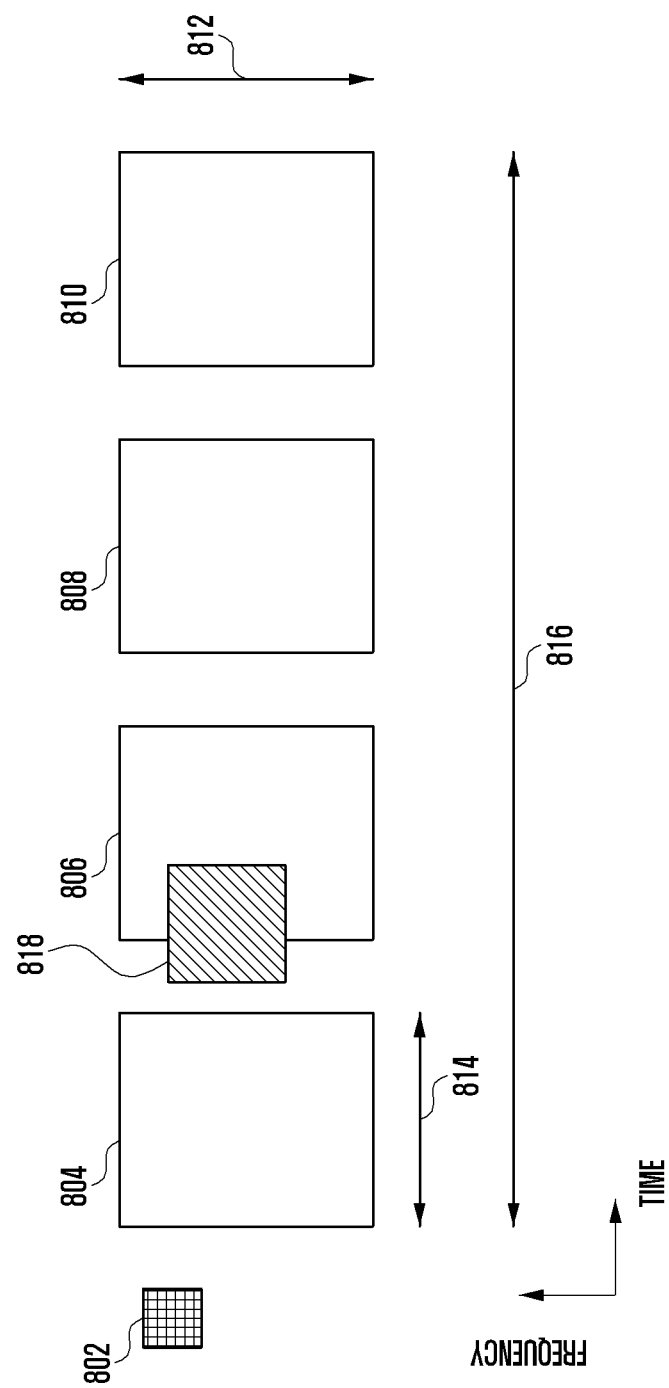
FIG. 8 is an illustration in which a periodic data transmission/reception resource overlaps a resource indicated by an interruption indicator in a situation where the periodic data transmission/reception resource is configured for a terminal according to an embodiment.

FIG. 8 is a view illustrating an example in which a periodic data transmission/reception resource overlaps a resource indicated by an interruption indicator in a situation where the periodic data transmission/reception resource is configured for a terminal.

Referring to FIG. 8, the terminal may be allocated a resource on which the terminal may perform transmission or reception and which is periodically configured by L1 signaling, higher signaling, or a combination thereof. An example of a periodic uplink resource may correspond to a grant-free resource, an SPS resource, or a periodic SRS transmission. When a grant-free resource is configured for the terminal, the terminal may use the relevant resource only if uplink data to be transmitted exists. In addition, the terminal may perform SRS transmission on a periodically-configured uplink resource in order to estimate an uplink channel. An example of a periodic downlink resource may correspond to an SPS resource or periodic channel state information reference signal (periodic CSI-RS) transmission. The terminal may receive data on a relevant periodic SPS resource, or may estimate a downlink channel through a periodic CSI-RS. Sizes 814 of individual time resource sections of the periodically-configured uplink or downlink resource domain may be configured to be all identical to, or different from, each other. Individual frequency resource sections 812 of the periodically-configured uplink or downlink resource domain may be configured to be all identical to, or different from, each other. In addition, a size 816 of the relevant periodic uplink or downlink resource sections may be configured or indicated by L1 signaling or higher signaling.

The terminal receives interruption indicator information through a downlink control channel 802, and if a resource domain 818 indicated by the relevant interruption indicator information at least partially overlaps a resource domain 806 pre-configured by RRC or L1 signaling, the terminal does not perform uplink data transmission, downlink data reception, reference signal transmission for uplink channel measurement, or reference signal reception for downlink channel measurement (or does not expect to perform them), which can be transmitted in the relevant overlapping resource domain.

If a periodically-configured resource is a grant-free uplink data transmission resource, the terminal receives interruption indicator information. If a resource domain 818 indicated by the relevant interruption indicator information at least partially overlaps the grant-free uplink data transmission resource domain 806 according to repeated transmission interval configuration, the terminal may transmit or may not transmit uplink data in other resource domains 804, 808, and 810, configured to perform repeated transmission, in addition to the relevant resource domain. A determination of whether the relevant data has been transmitted may be based on an RV value. In addition, for example, size 816 may signify the value of a cycle during which repeated transmission can be performed.

For example, if an RV value of uplink data according to grant-free uplink data transmission resources is set to {0, 0, 0, 0}, data itself, transmitted on each transmission resource, includes decodable information. Therefore, in the example, although a partial resource domain of at least one of uplink resource domains, in which repeated transmission can be performed, at least partially overlaps a resource domain indicated by the interruption indicator information, the terminal may perform repeated transmission on the remaining non-overlapping resources. That is, the terminal may transmit uplink data in resource domains 804, 808, and 810. However, if an RV value of uplink data according to grant-free uplink data transmission resources is set to {0, 3, 1, 2}, data themselves respectively corresponding to the remaining values except 0 and 3 do not include decodable information. Therefore, if the resource domain indicated by the interruption indicator information overlaps a part of an uplink resource domain in which data corresponding to an RV value of 0 or 3 is transmitted, the terminal may not perform the entire relevant configured repeated transmission (or may expect not to perform the same). Instead, the terminal may consider transmission of data to be transmitted during the next repeated transmission.

Figure 9:
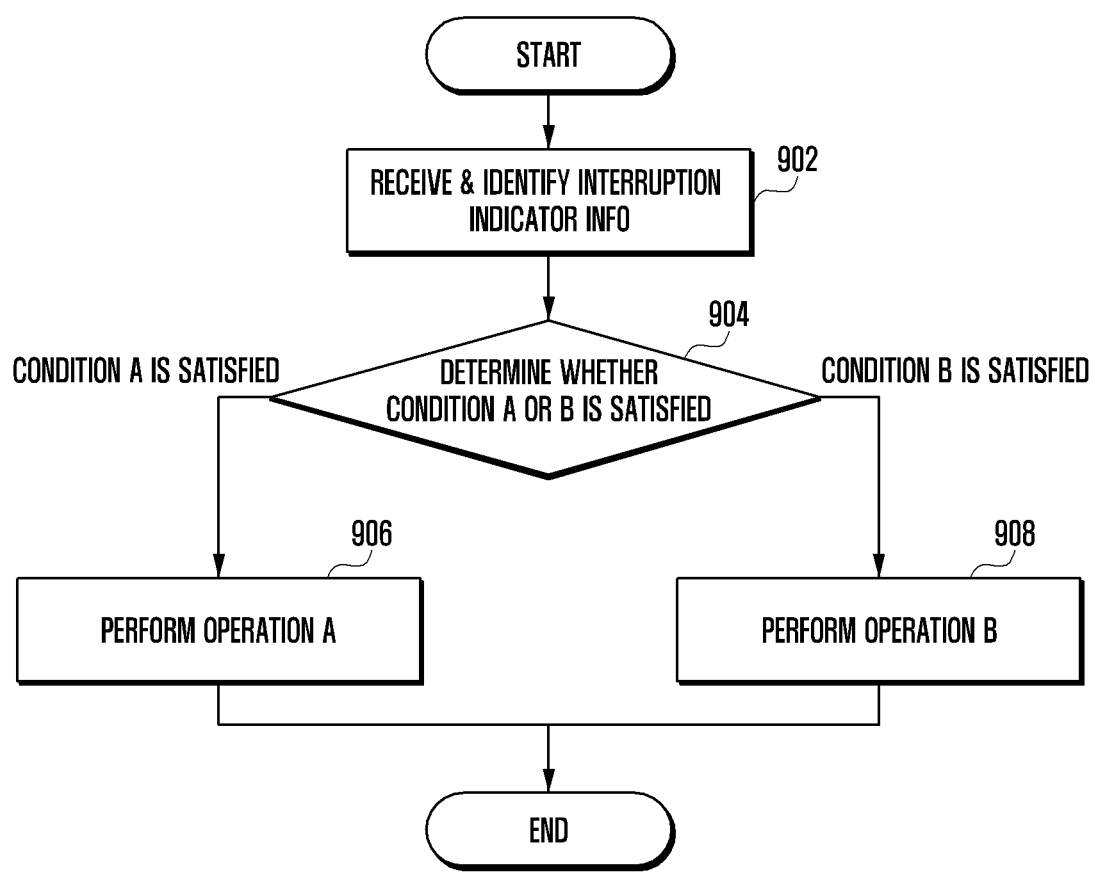
FIG. 9 is a flowchart of a method of an operation of a terminal according to reception of interruption indicator information according to an embodiment.

FIG. 9 is a flowchart of an operation of a terminal according to reception of interruption indicator information.

Referring to FIG. 9, in step 902, the terminal first receives interruption indicator information on a pre-configured UE-group-common control channel resource, and identifies a resource domain indicated by the relevant interruption indicator information. In step 904, the terminal determines whether condition A or B is satisfied, by considering an uplink or downlink resource domain scheduled for the terminal itself and a resource domain indicated by the interruption indicator information. If condition A is satisfied, in step 906, the terminal performs operation A.

Condition A may be one of the following conditions or a combination of at least two thereof.

1. If a resource domain indicated by interruption indicator information at least partially overlaps, from the perspective of time, a scheduled uplink or downlink resource domain 2. If a resource domain indicated by interruption indicator information at least partially overlaps, from the perspective of time and frequency, a scheduled uplink or downlink resource domain 3. If at least some of repeated (or multi-) transmission scheduled resource domains at least partially overlap, from the perspective of time, a resource domain indicated by interruption indicator information 4. If at least some of repeated (or multi-) transmission scheduled resource domains at least partially overlap, from the perspective of time and frequency, a resource domain indicated by interruption indicator information Operation A may be one of the following operations or a combination of at least two thereof.

1. Data is transmitted or received in the remaining resource domain except a part overlapping a resource domain indicated by interruption indicator information 2. If a resource is a transmission resource (an uplink resource) and a waveform applied to the relevant transmission is DFT-S-OFDM, data (or control information) is transmitted in the remaining resource domain except a resource domain at least partially and temporally overlapping a resource domain indicated by interruption indicator information 3. If a resource is a transmission resource and a waveform applied to the relevant transmission is OFDM, data (or control information) is transmitted in the remaining resource domain except a resource domain at least partially and temporally (or from the perspective of a combination of time and frequency) overlapping a resource domain indicated by interruption indicator information 4. A transport block to be transmitted or received is not transmitted or received in an at least partially overlapping data resource domain in a resource domain and a time domain (or a time and frequency domain) indicated by interruption indicator information 5. A code block (or a code block group) to be transmitted or received is not transmitted or received in an at least partially overlapping data resource domain in a resource domain and a time domain (or a time and frequency domain) indicated by interruption indicator information 6. Uplink control information (UCI) applied to an at least partially overlapping control channel resource domain is not transmitted or received in a resource domain and a time domain (or a time and frequency domain) indicated by interruption indicator information If condition B is satisfied, in step 908, the terminal performs operation B.

Condition B may be one of the following conditions.

1. If a resource domain indicated by interruption indicator information does not overlap, from the perspective of time, a scheduled uplink or downlink resource domain Operation B may be one of the following operations.

1. Data (or control information) is transmitted or received in a pre-configured resource domain In the present disclosure, data or control information of which uplink or downlink transmission/reception has been configured may be used for a first-type service and/or a third-type service. In addition, a resource domain indicated by interruption indicator information may be used for a second-type service, but the present disclosure is not limited thereto.

Figure 10:
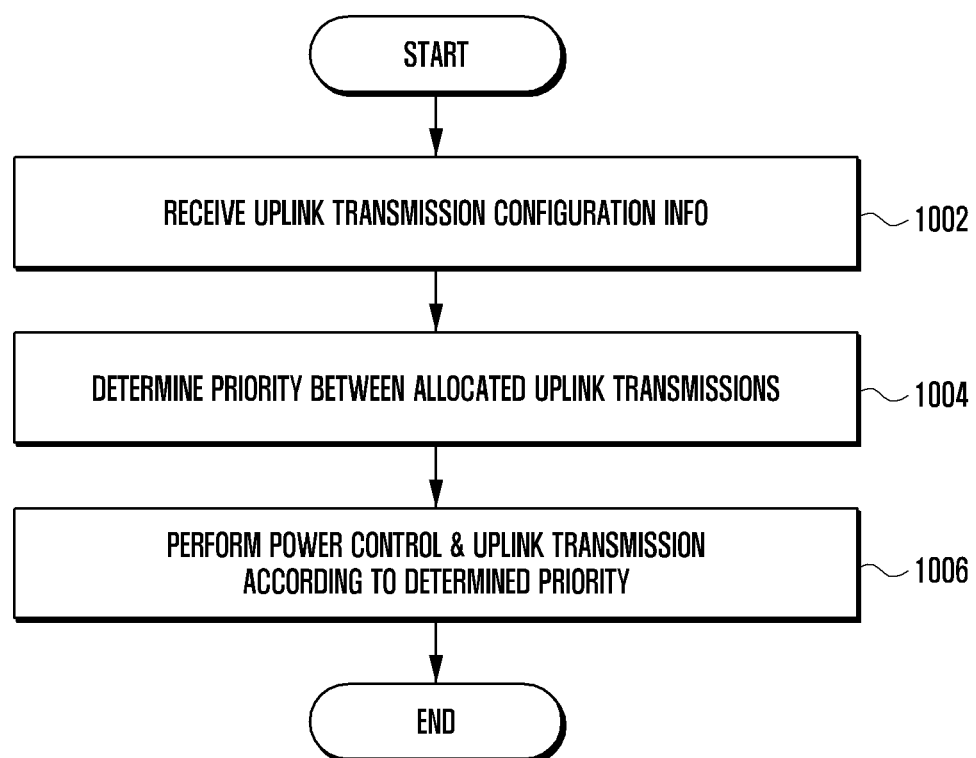
FIG. 10 is a flowchart of a power control method of a terminal according to an embodiment.

FIG. 10 is a flowchart of a power control method of a terminal.

Referring to FIG. 10, in step 1002, the terminal receives information on uplink transmission configuration. An example of uplink transmission may correspond to uplink data transmission, control information transmission, or random access information transmission. In addition, uplink transmission configuration information may include uplink data resource allocation information for uplink data transmission. Then, in step 1004, if multiple uplink transmissions allocated for a particular time exist, the terminal determines a priority between the multiple transmissions.

Generally, control information transmission (i.e., transmission in a case where UCI piggybacks on PUCCH transmission and a PUSCH) is determined to have a higher priority than that of data transmission (i.e., PUSCH transmission), but if data transmission is performed for a URLLC service or a service sensitive to a delay time, data transmission according to such a service needs to be determined to have a higher priority. Below, a method for determining a priority between data transmission and control information transmission according to a URLLC service or a service sensitive to a delay time is described.

If two PUSCH resources overlap at a particular time point (a symbol or slot unit), the terminal may determine a priority between the two PUSCHs based on DCI, which indicates scheduling to each of the two PUSCHs, and an RNTI used to scramble a CRC attached to the DCI. The two PUSCH sources in one slot do not overlap from the perspective of a symbol, but may overlap from the perspective of a slot, and thus, the overlapping may refer to the latter case. That is, the overlapping from the perspective of a slot may signify a case in which overlapping does not occur to absolute time when each PUSCH is transmitted in a slot but two PUSCHs exist in one slot. Alternatively, if even at least one symbol overlaps in time resources on which two PUSCHs are transmitted, the terminal may determine that the PUSCH resources overlap each other from the perspective of a symbol. That is, the overlapping from the perspective of a symbol may signify a case in which overlapping occurs, from the perspective of absolute time, to the time when two PUSCHs are transmitted.

The terminal may assign a higher priority to uplink data transmission scheduled by control information including a CRC bit scrambled with an RNTI (e.g., which may be referred to as a URLLC-RNTI, a special C-RNTI, or a URLLC-RNTI) for supporting a URLLC service or a service sensitive to a delay time than that of uplink data transmission scheduled by control information including a CRC bit scrambled with a C-RNTI.

Specifically, the terminal may first assign transmission power to a PUSCH through which uplink data scheduled by control information including a CRC bit scrambled with a URLLC-RNTI is transmitted, and if the other remaining power exists, the terminal may allocate the same to a PUSCH through which uplink data scheduled by control information including a CRC scrambled with a C-RNTI is transmitted.

Alternatively, if a PUSCH resource, on which uplink data scheduled by control information including a CRC bit scrambled with a C-RNTI is transmitted, and a PUCCH resource, which includes HARQ-ACK feedback information on downlink data scheduled by control information including a CRC bit scrambled with a URLLC-RNTI, overlap each other from the perspective of a slot or symbol, the terminal may discard the PUSCH resource (or may not perform PUSCH transmission, or may drop PUSCH transmission). That is, the terminal may transmit UCI information including HARQ-ACK feedback information on the pre-indicated PUCCH resource, without causing the UCI information including the HARQ-ACK feedback information piggybacking on a PUSCH resource.

Alternatively, if a PUCCH resource (or a PUCCH resource including channel measurement result feedback reporting on CSI-RS measurement), which includes HARQ-ACK feedback information on downlink data transmission scheduled by control information including a CRC bit scrambled with a C-RNTI, and a PUSCH resource, which includes uplink data scheduled by control information including a CRC bit scrambled with a URLLC-RNTI, overlap each other (from the perspective of a slot or symbol), the terminal may prioritize the PUSCH resource. That is, the terminal may not map UCI information, included in a PUCCH resource, to the PUSCH resource according to a piggyback scheme. If it is possible to simultaneously transmit a PUCCH and a PUSCH, the terminal may first allocate power to the PUSCH according to a priority thereof, and may allocate the remaining power to the PUCCH. If it is impossible to simultaneously transmit a PUCCH and a PUSCH, the terminal may drop PUCCH transmission and may transmit only the PUSCH. For example, the terminal may separately receive a grant from the base station so as to retransmit the non-transmitted PUCCH, or may perform PUCCH resource transmission in a resource domain implicitly configured by higher signaling without a grant. That is, in relation to at least two overlapping PUSCH transmissions, the terminal may determine which PUSCH is to be allocated power first, on the basis of DCI which issues instructions to each PUSCH and an RNTI scrambled with a CRC bit attached to the DCI. In addition, in relation to at least two overlapping PUCCH transmissions, the terminal may determine which PUCCH is to be allocated power first, on the basis of DCI which issues instructions to each PUCCH and an RNTI scrambled with a CRC bit attached to the DCI.

A method for determining a priority between transmissions on the basis of a URLLC-RNTI is described above, but it is also possible to determine a priority between transmissions based on the length of the DCI. The length of the DCI may be determined based on a DCI format or the length of information bits before channel coding. There is a high possibility that the DCI for a URLLC service or a service sensitive to a delay time may have a short length for quick processing. Therefore, uplink data transmission using DCI having a short length of information bits may be determined to have a higher priority.

A method for determining a priority between transmissions on the basis of a URLLC-RNTI is described above, but it is possible to determine a priority between transmissions based on configuration information for a control resource set (CORESET) on which DCI is transmitted. An example of the configuration information for a CORESET may correspond to a monitoring cycle of a CORESET, the size of a frequency or time resource domain of a CORESET, a demodulation reference signal (DMRS) transmission scheme (e.g., a broadband DMRS transmission scheme or a narrowband DMRS transmission scheme) applied to a CORESET, a frequency domain section in which a CORESET is transmitted, a value of numerology configuration applied to a CORESET, or the like. If the above-described configuration information for a CORESET on which the DCI that schedules uplink data is transmitted differs from configuration information for another CORESET with respect to at least one item, the difference may be determined to be configuration information for the DCI for a URLLC service or a service sensitive to a delay time.

Further, it is possible to determine a priority between transmissions through a time point at which the DCI is detected through a CORESET. For example, if uplink transmission resources indicate at time point "a" and at time point "b" after time point "a" at least partially overlap each other, the terminal may determine that an uplink transmission resource, indicated at time point "b" at which data is finally received, has a higher priority. The above-described priority determination methods may be applied as a combination of one or more thereof when a priority is determination, and if multiple criteria are applied, the methods may be applied in a predetermined order.

In step 1006, the terminal performs power control of an uplink resource domain by considering the above-described priorities, and performs uplink transmission. Alternatively, the terminal performs uplink transmission by considering the above-described priorities.

Figure 11:
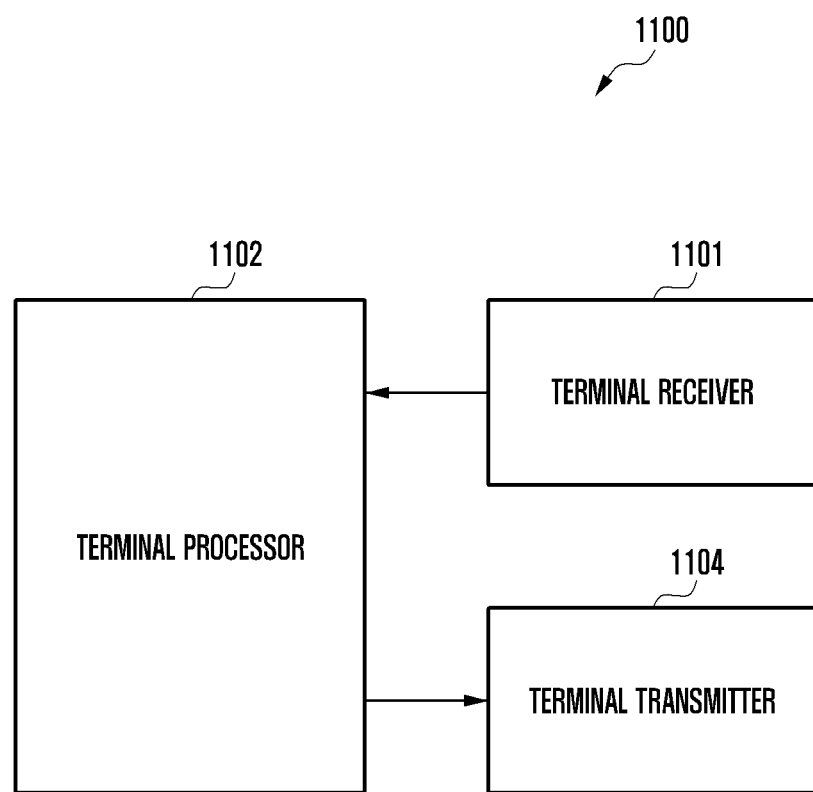
FIG. 11 is a block diagram of a terminal of the present disclosure.

FIG. 11 is a block diagram of a terminal 1000.

Referring to FIG. 11, the terminal 1100 may include a terminal receiver 1101, a terminal transmitter 1104, and a terminal processor 1102. The terminal receiver 1101 and the terminal transmitter 1104 may be collectively referred to as a transceiver. The transceiver may be configured to transmit or receive a signal to or from a base station. The signal may include control information and data. Accordingly, the transceiver may include an RF transmitter configured to up-convert and amplify a frequency of the transmitted signal, an RF receiver configured to low-noise-amplify the received signal and down-convert the frequency, and the like. In addition, the transceiver may be configured to receive a signal through a radio channel and output the received signal to the terminal processor 1102, and may be configured to transmit a signal output from the terminal processor 1102 through a radio channel. The terminal processor 1102 may be configured to control a series of processes so that the terminal 1100 may operate according to the above-described embodiments. For example, the terminal receiver 1101 may be configured to receive a signal including interruption indicator information from the base station, and the terminal processor 1102 may be configured to control to interpret an overlapping relationship between an allocated uplink or downlink transmission/reception resource and a resource indicated by the interruption indicator information. Thereafter, the terminal transmitter 1104 may be configured to transmit an uplink signal based on the overlapping relationship.

Figure 12:
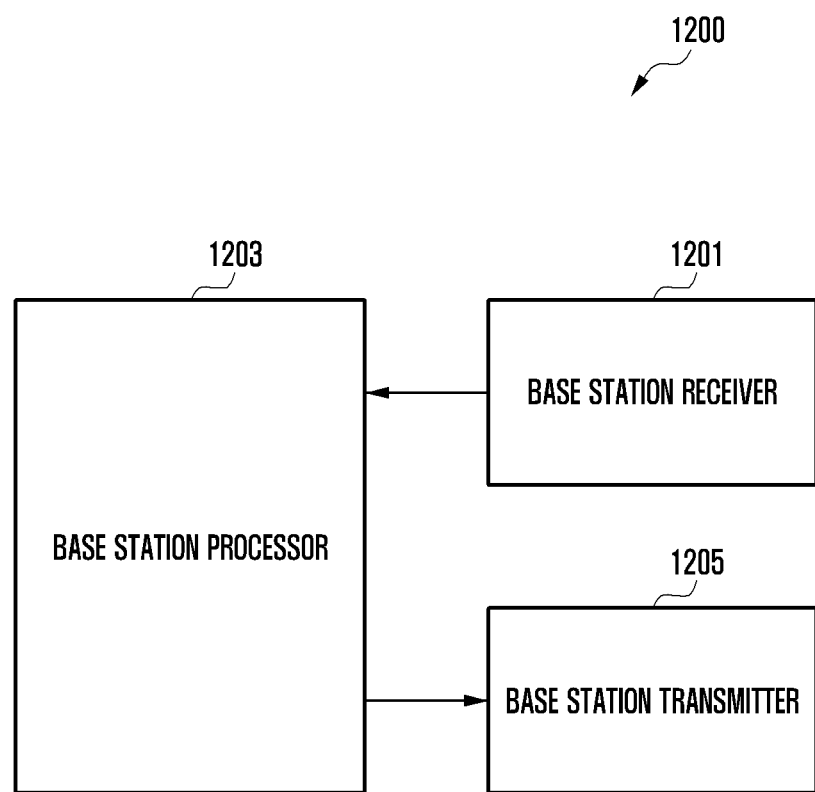
FIG. 12 is a block diagram of a base station of the present disclosure.

FIG. 12 is a block diagram of a base station 1200.

Referring to FIG. 12, the base station 1200 may include a base station receiver 1201, a base station transmitter 1205, and a base station processor 1203. The terminal receiver 1201 and the terminal transmitter 1205 may be collectively referred to as a transceiver. The transceiver may be configured to transmit or receive a signal to or from the terminal 1100. The signal may include control information and data. Accordingly, the transceiver may include an RF transmitter configured to up-convert and amplify a frequency of the transmitted signal, an RF receiver configured to low-noise-amplify the received signal and down-convert the frequency, and the like. In addition, the transceiver may be configured to receive a signal through a radio channel and output the received signal to the terminal processor 1203, and may be configured to transmit a signal output from the terminal processor 1203 through a radio channel. The base station processor 1203 may control a series of processes so that the base station 1200 can operate according to the above-described embodiments. For example, the base station processor 1203 may be configured to determine a resource on which uplink or downlink transmission/reception is not to be performed, and may be configured to control to generate interruption indicator information to be transmitted to the terminal 1100. Thereafter, the base station transmitter 1205 may be configured to deliver the interruption indicator to the terminal 1100, and the base station receiver 1201 may be configured to receive an uplink signal based on the interruption indicator.

The embodiments disclosed in the present disclosure and the accompanying drawings are merely presented as examples in order to easily describe the present disclosure and facilitate understanding of the present disclosure but are not intended to limit the scope of the present disclosure. It will be apparent to those skilled in the art to which the present disclosure pertains that different modifications based on the technical idea of the present disclosure may be practiced. In addition, embodiments described herein may be combined and practiced as needed. For example, the base station and the terminal may be operated by combining the parts of the embodiments. In addition, although the present disclosure is presented based on the NR system, other modifications based on the present disclosure may be applicable to other systems such as the FDD or the TDD LTE system.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. A method performed by a terminal in a wireless communication system, the method comprising:
   receiving, from a base station, configuration information including a plurality of information elements for a time-frequency region;
   receiving control information from the base station; and
   cancelling a transmission of physical uplink shared channel (PUSCH) associated with a time-frequency region indicated by the control information,
   wherein the time-frequency region indicated by the control information is associated with at least one of the plurality of information elements included in the configuration information.

2. The method of claim 1, wherein the configuration information includes a number of bits for a cancellation indicator included in the control information and information associated with the time-frequency region, and
   wherein the information associated with the time-frequency region includes a number of symbols included in the time-frequency region and a number of physical resource blocks in the time-frequency region.

3. The method of claim 1, wherein the control information includes a cancellation indicator indicating at least one symbol or at least one physical resource block (PRB) included in the time-frequency region.

4. The method of claim 3, wherein the cancellation indicator includes a first number of bits where each of the first number of bits indicates a group of $\lfloor T/a \rfloor$ symbols, and a second number of bits where each of the second number of bits indicates a group of $\lceil T/a \rceil$ symbols,
   where T is a number of symbols included in the time-frequency region and a is a number of partitions for the symbols.

5. The method of claim 1, further comprising cancelling a repetition of a transmission of the PUSCH associated with the time-frequency region indicated by the control information, in case that the transmission of the PUSCH includes repetitions.

6. A method performed by a base station in a wireless communication system, the method comprising:
   transmitting, to a terminal, configuration information including a plurality of information elements for a time-frequency region; and
   transmitting control information to the terminal;
   wherein a transmission of physical uplink shared channel (PUSCH) associated with a time-frequency region indicated by the control information is cancelled by the terminal, and
   wherein the time-frequency region indicated by the control information is associated with at least one of the plurality of information elements included in the configuration information.

7. The method of claim 6,
   wherein the configuration information includes a number of bits for a cancellation indicator included in the control information and information associated with the time-frequency region, and
   wherein the information associated with the time-frequency region includes a number of symbols included in the time-frequency region and a number of physical resource blocks in the time-frequency region.

8. The method of claim 6, wherein the control information includes a cancellation indicator indicating at least one symbol or at least one physical resource block (PRB) included in the time-frequency region.

9. The method of claim 8, wherein the cancellation indicator includes a first number of bits where each of the first number of bits indicates a group of $\lfloor T/a \rfloor$ symbols, and a second number of bits where each of the second number of bits indicates a group of $\lceil T/a \rceil$ symbols,
where T is a number of symbols included in the time-frequency region and a is a number of partitions for the symbols.

10. The method of claim 6, wherein a repetition of a transmission of the PUSCH associated with the time-frequency region indicated by the control information is cancelled by the terminal, in case that the transmission of the PUSCH includes repetitions.

11. A terminal in a wireless communication system, the terminal comprising:
a transceiver; and
a controller coupled with the transceiver and configured to:
receive, from a base station via the transceiver, configuration information including a plurality of information elements for a time-frequency region,
receive, control information from the base station,
cancel a transmission of physical uplink shared channel (PUSCH) associated with a time-frequency region indicated by the control information,
wherein the time-frequency region indicated by the control information is associated with at least one of the plurality of information element included in the configuration information.

12. The terminal of claim 11, wherein the configuration information includes a number of bits for a cancellation indicator included in the control information and information associated with the time-frequency region, and
wherein the information associated with the time-frequency region includes a number of symbols included in the time-frequency region and a number of physical resource blocks in the time-frequency region.

13. The terminal of claim 11, wherein the control information includes a cancellation indicator indicating at least one symbol or at least one physical resource block (PRB) included in the time-frequency region.

14. The terminal of claim 13, wherein the cancellation indicator includes a first number of bits where each of the first number of bits indicates a group of $\lfloor T/a \rfloor$ symbols, and a second number of bits where each of the second number of bits indicates a group of $\lceil T/a \rceil$ symbols,
where T is a number of symbols included in the time-frequency region and a is a number of partitions for the symbols.

15. The terminal of claim 11, wherein the controller is further configured to cancel a repetition of a transmission of the PUSCH associated with the time-frequency region indicated by the control information, in case that the transmission of the PUSCH includes repetitions.

16. A base station in a wireless communication system, the base station comprising:
a transceiver; and
a controller coupled with the transceiver and configured to:
transmit, to a terminal via the transceiver, configuration information including a plurality of information elements for a time-frequency region, and
transmit control information to the terminal,
wherein a transmission of physical uplink shared channel (PUSCH) associated with a time-frequency region indicated by the control information is cancelled by the terminal, and
wherein the time-frequency region indicated by the control information is associated with at least one of the plurality of information element included in the configuration information.

17. The base station of claim 16, wherein the configuration information includes a number of bits for a cancellation indicator included in the control information and information associated with the time-frequency region, and
wherein the information associated with the time-frequency region includes a number of symbols included in the time-frequency region and a number of physicals resource block in the time-frequency region.

18. The base station of claim 16, wherein the control information includes a cancellation indicator indicating at least one symbol or at least one physical resource block (PRB) included in the time-frequency region.

19. The base station of claim 18, wherein the cancellation indicator includes a first number of bits where each of the first number of bits indicates a group of $\lfloor T/a \rfloor$ symbols, and a second number of bits where each of the second number of bits indicates a group of $\lceil T/a \rceil$ symbols,
where T is a number of symbols included in the time-frequency region and a is a number of partitions for the symbols.

20. The base station of claim 16, wherein a repetition of a transmission of the PUSCH associated with the time-frequency region indicated by the control information is cancelled by the terminal, in case that the transmission of the PUSCH includes repetitions.

* * * * *